US007849895B2

(12) United States Patent
Fukunaga

(10) Patent No.: US 7,849,895 B2
(45) Date of Patent: Dec. 14, 2010

(54) PNEUMATIC TIRE HAVING DIRECTIONAL TREAD PATTERN

(75) Inventor: Takayuki Fukunaga, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1000 days.

(21) Appl. No.: 11/597,742

(22) PCT Filed: May 27, 2005

(86) PCT No.: PCT/JP2005/009792

§ 371 (c)(1),
(2), (4) Date: Nov. 27, 2006

(87) PCT Pub. No.: WO2005/115770

PCT Pub. Date: Dec. 8, 2005

(65) Prior Publication Data

US 2007/0215258 A1   Sep. 20, 2007

(30) Foreign Application Priority Data

| May 27, 2004 | (JP) | ............... 2004-158059 |
| May 27, 2004 | (JP) | ............... 2004-158060 |
| Sep. 13, 2004 | (JP) | ............... 2004-265904 |
| Sep. 13, 2004 | (JP) | ............... 2004-265905 |
| Sep. 13, 2004 | (JP) | ............... 2004-265906 |

(51) Int. Cl.
B60C 11/11 (2006.01)
B60C 11/12 (2006.01)
B60C 11/13 (2006.01)

(52) U.S. Cl. .................. 152/209.15; 152/209.22; 152/209.24; 152/209.27; 152/209.28; 152/DIG. 3

(58) Field of Classification Search ............ 152/209.15, 152/209.18, 209.22, 209.24, 209.27, 209.28, 152/DIG. 3
See application file for complete search history.

(56) References Cited

U.S. PATENT DOCUMENTS 4,057,089 A  * 11/1977 Johannsen ............ 152/209.28

4,456,046 A    6/1984 Miller (Continued)

FOREIGN PATENT DOCUMENTS

EP    0 997 323 A2    5/2000

(Continued)

OTHER PUBLICATIONS

Machine translation for Japan 2003-237319 (no date).*

(Continued)

Primary Examiner—Steven D Maki
(74) Attorney, Agent, or Firm—Sughrue Mion, PLLC

(57) ABSTRACT

The present invention provides a pneumatic tire which can obtain a high wet drainage performance, roadholding ability, and wear-resistant property without sacrificing other capabilities A directional pattern is formed by a circumferential wide major groove, a first narrow circumferential minor groove, a second narrow circumferential minor groove, a first transverse groove, a second transverse groove, and a third transverse groove. The circumferential wide major groove is provided in a center region in a tire width direction of a tread. The first narrow circumferential minor groove is arranged on the outside in a tire axis direction of the circumferential wide major groove. The second narrow circumferential minor groove is arranged on the outside in the tire axis direction of the first narrow circumferential minor groove. The first transverse groove is extended from a tread end and coupled to the circumferential wide major groove. The second transverse groove is arranged between the first transverse grooves, and the second transverse groove is extended from the tread end and terminated while not coupled to the circumferential wide major groove. The third transverse groove is arranged between the first transverse groove and the second transverse groove, and the third transverse groove is extended from the tread end and terminated between the first narrow circumferential minor groove and the second narrow circumferential minor groove.

11 Claims, 18 Drawing Sheets

U.S. PATENT DOCUMENTS

| | | | | |
|---|---|---|---|---|
| 5,154,783 | A * | 10/1992 | Kuhr et al. | 152/209.28 |
| 5,234,042 | A * | 8/1993 | Kuhr et al. | 152/209.28 |
| 6,305,450 | B1 * | 10/2001 | Guermandi | 152/209.18 |
| 2001/0010244 | A1 * | 8/2001 | Himuro | 152/209.3 |
| 2002/0005238 | A1 * | 1/2002 | Boiocchi et al. | 152/209.27 |
| 2004/0134582 | A1 * | 7/2004 | Murata | 152/209.18 |

FOREIGN PATENT DOCUMENTS

| | | | |
|---|---|---|---|
| EP | 1075971 | * | 2/2001 |
| EP | 1 437 237 A2 | | 7/2004 |
| JP | 57-194106 A | | 11/1982 |
| JP | 63-61606 A | | 3/1988 |
| JP | 3-10911 A | | 1/1991 |
| JP | 04-002508 | * | 1/1992 |
| JP | 05-254311 | * | 10/1993 |
| JP | 5-254311 A | | 10/1993 |
| JP | 10-100615 A | | 4/1998 |
| JP | 10-166815 | * | 6/1998 |
| JP | 10-278512 A | | 10/1998 |
| JP | 11-189011 A | | 7/1999 |
| JP | 11-198609 A | | 7/1999 |
| JP | 2000-238511 | * | 9/2000 |
| JP | 2001-71709 A | | 3/2001 |
| JP | 2001-225611 | * | 8/2001 |
| JP | 2001-225611 A | | 8/2001 |
| JP | 2003-146024 A | | 5/2003 |
| JP | 2003-237319 | * | 8/2003 |
| JP | 2003-320814 A | | 11/2003 |

OTHER PUBLICATIONS

Machine translation for Japan 05-254311 (no date).*
Supplementary European Search Report dated Nov. 25, 2008 (3 pages).

* cited by examiner

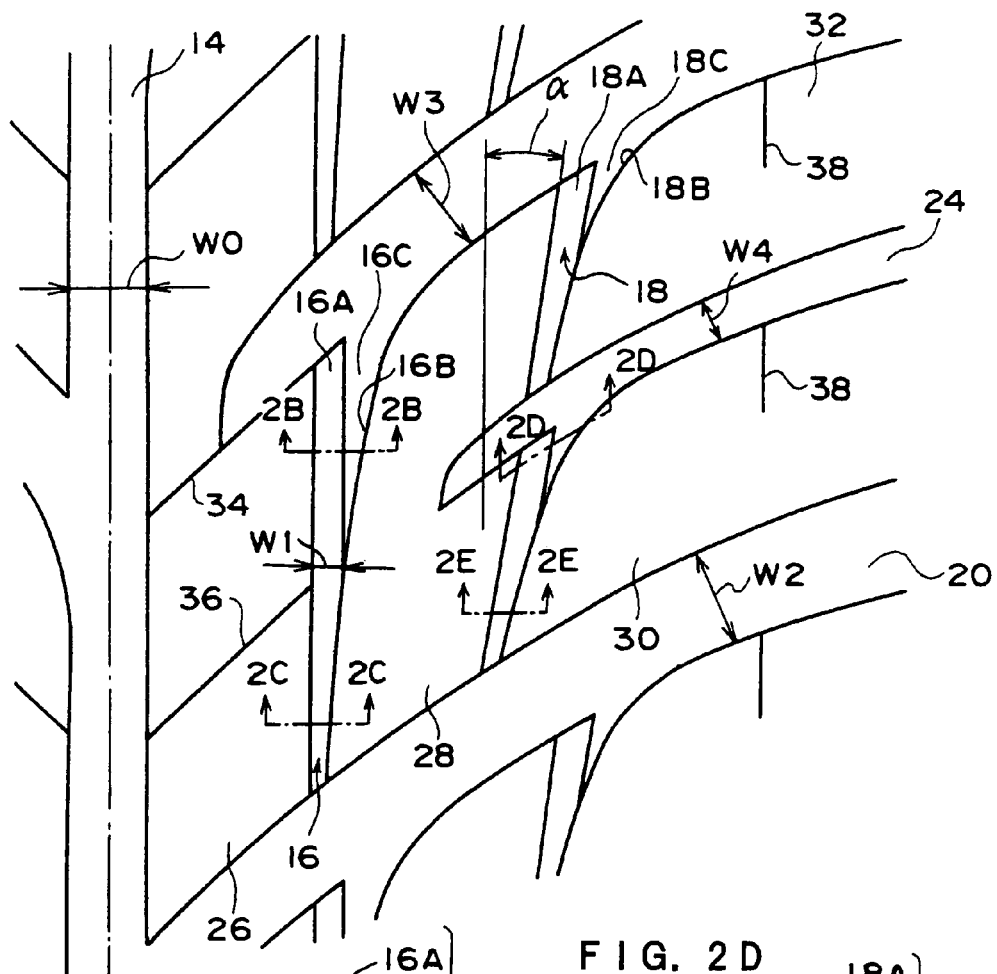
FIG. 2A
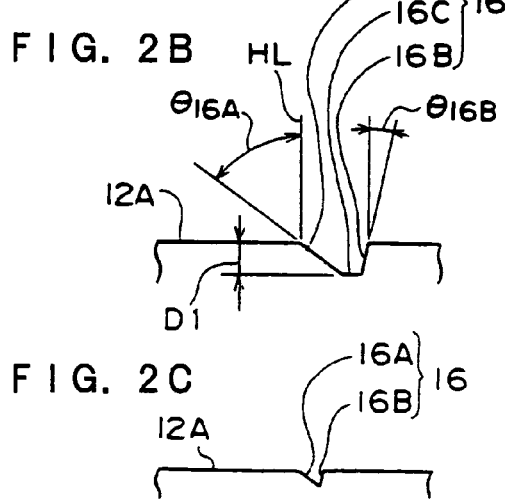
FIG. 2B
FIG. 2C
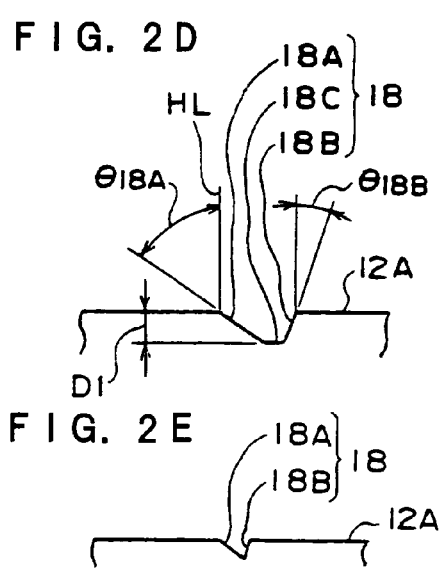
FIG. 2D
FIG. 2E

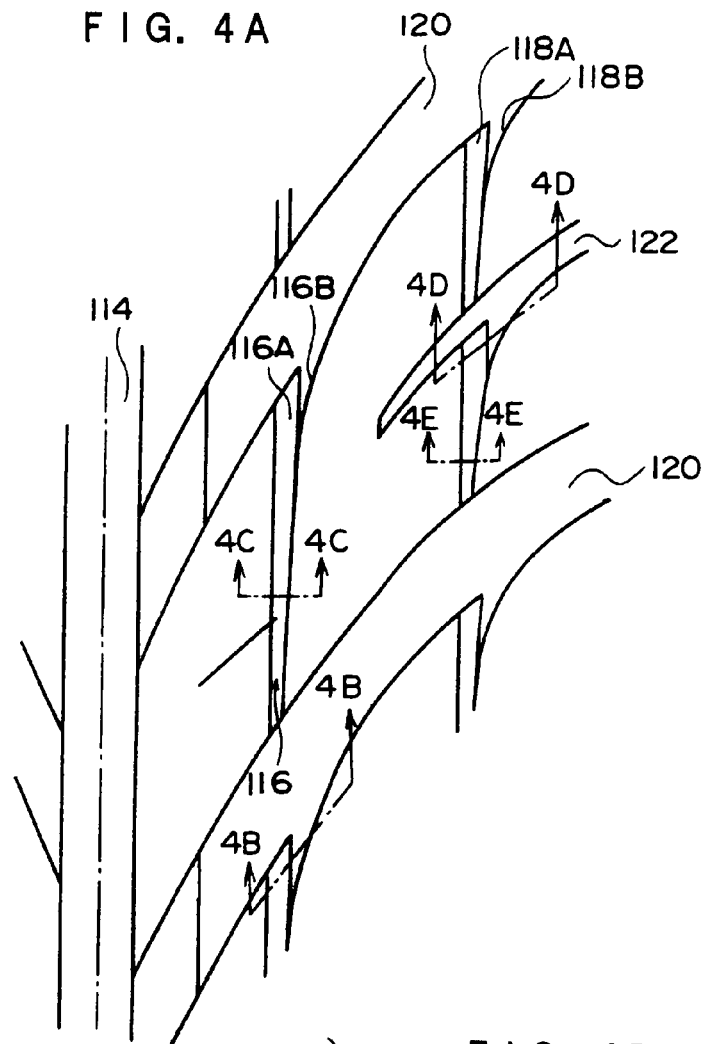
FIG. 4A
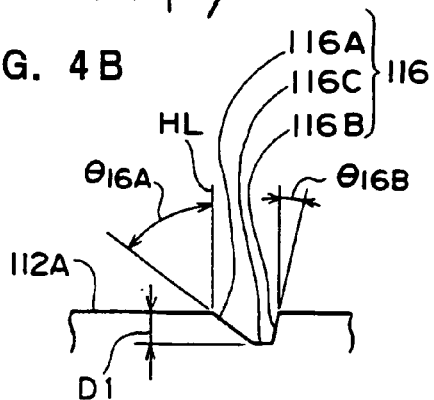
FIG. 4B
FIG. 4C
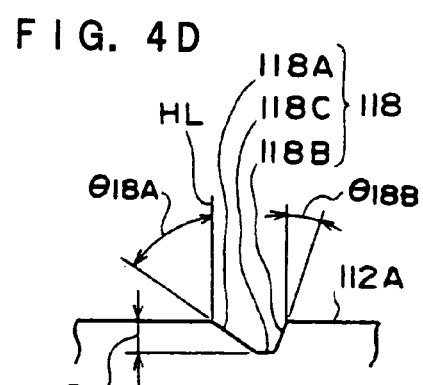
FIG. 4D
FIG. 4E

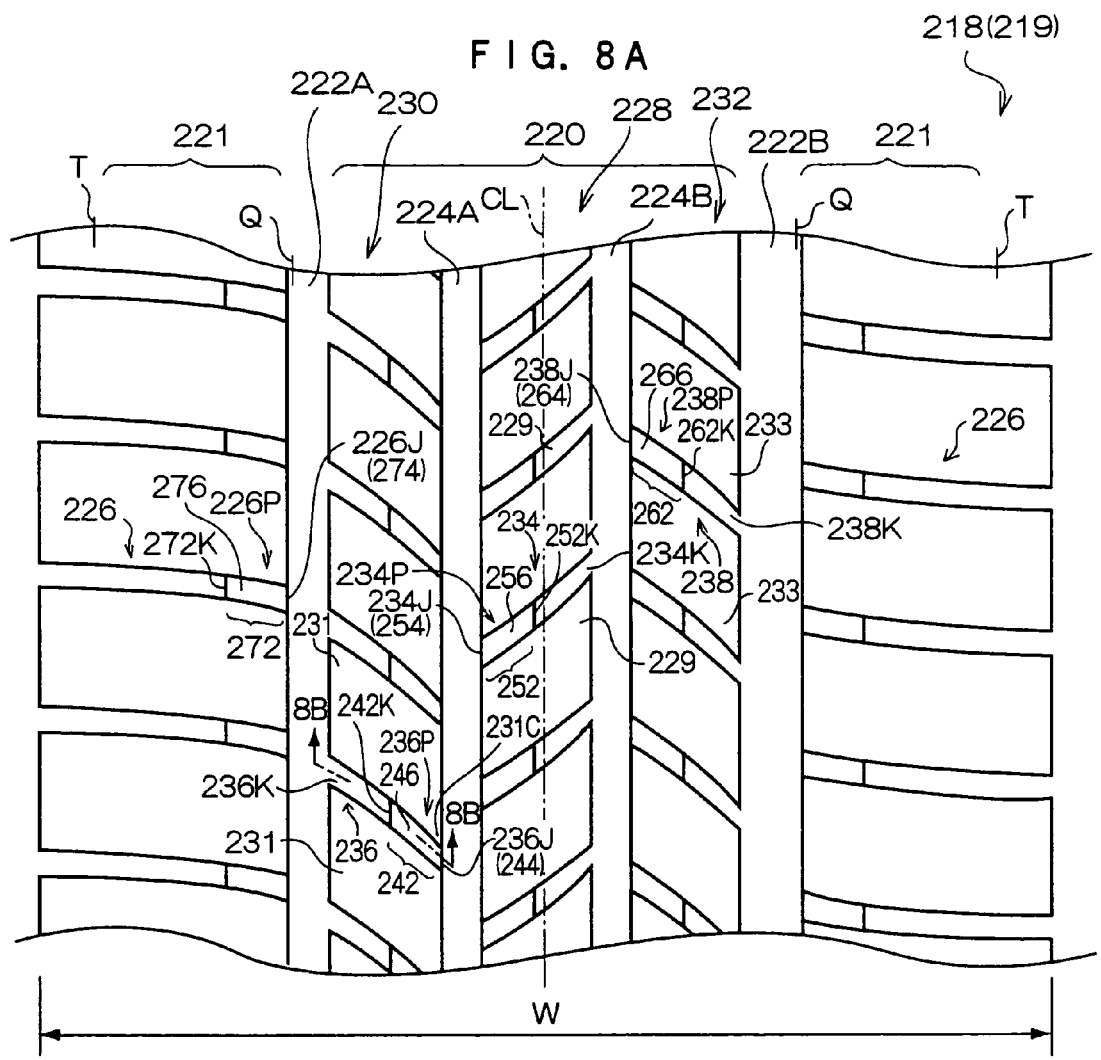
F I G. 8A
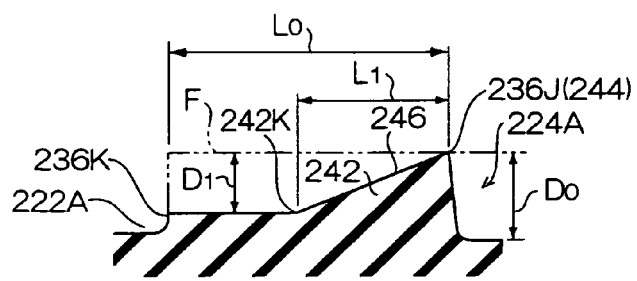
F I G. 8B

PNEUMATIC TIRE HAVING DIRECTIONAL TREAD PATTERN

TECHNICAL FIELD

The present invention relates to a pneumatic tire, particularly to the pneumatic tire which can obtain a high wet drainage property without sacrificing other capabilities.

BACKGROUND ART

In the pneumatic tire, a circumferential groove and a transverse groove are arranged in a tread to obtain wet performance (see Patent Documents 1 to 3).

Conventionally, in the pneumatic tire, various devices are made to improve tire performance (for example, see Patent Documents 4 to 7). In order to improve the drainage on a wet road surface, a groove volume is increased by increasing a groove width or a groove depth.

In a racing ultra-high performance vehicle tire, a technique of linearly arranging several circumferential grooves in a center region of the tread is taken to improve hydroplaning performance, and the technique increases a negative ratio.

Patent Document 1: Japanese Patent Laid-Open No. 57-194106 (FIG. 2)

Patent Document 2: Japanese Patent Laid-Open No. 3-10911 (FIGS. 1 and 2)

Patent Document 3: Japanese Patent Laid-Open No. 11-189011 (FIG. 1)

Patent Document 4: Japanese Patent Laid-Open No. 2001-225611

Patent Document 5: Japanese Patent Laid-Open No. 10-100615

Patent Document 6: Japanese Patent Laid-Open No. 2003-320814

Patent Document 7: Japanese Patent Laid-Open No. 63-061606

DISCLOSURE OF THE INVENTION

Subjects to be Addressed by the Invention

However, when the groove width or the groove depth is increased, a ground contact area is decreased on the dry road surface, and a shortage of rigidity may be cased in a land portion, which may result in lower roadholding ability on the dry road surface. An uneven wear-resistant property may be also decreased.

The following countermeasures are effective in improving the roadholding ability or the pattern noise property on the dry road surface. That is, the grove area is decreased to increase the ground contact area, and a step-shape bottom raising portion is provided in the transverse groove of an end portion of the land portion to enhance block rigidity.

However, in the above countermeasures, the groove volume is decreased and turbulence is generated in a water flow to affect the drainage property by the step, which results in drainage property and the roadholding ability to be decreased on the wet road surface.

In the racing ultra-high performance vehicle tire, a hydroplaning phenomenon is easily generated because of high running speed. In a racing ultra-high performance vehicle rear-tire, the hydroplaning phenomenon is easily generated from a low speed region because of wide ground contact width. Therefore, such techniques are taken as widening the groove width to increase the negative ratio or arranging the several linear major grooves in the center region so as to solve the hydroplaning phenomenon. However, the area of the land portion is decreased in the center region and a block width is also decreased, which results in a decrease in grip and a decrease in wear-resistant property.

In the racing ultra-high performance vehicle tire, a technique of continuously arranging rib-shape land portions in a central region in a tire axis direction is taken to improve handling performance. The land portions are continuously formed in the tire circumferential direction. However, the drainage property of the central region in the tire axis direction toward the tire width direction is decreased to cause the wet drainage property to be decreased in the central region in the tire axis direction.

In view of the foregoing, an object of the invention is to provide a pneumatic tire which can obtain a high wet drainage performance without sacrificing other capabilities (such as roadholding ability, pattern noise property, and wear-resistant property).

Means for Addressing the Subject

One aspect of the exemplary embodiments provides a pneumatic tire which has at least one circumferential wide major groove, plural transverse grooves, and a narrow circumferential minor groove. The circumferential wide major groove is provided in a center region in a tire width direction of a tread, the circumferential wide major groove is extended in a tire circumferential direction. The transverse groove is provided in the tread and extended from a tread end toward the circumferential wide major groove while inclined with respect to the tire circumferential direction. The narrow circumferential minor groove is arranged on an outside in a tire axis direction of the circumferential wide major groove and is extended in the tire circumferential direction. A groove width of the narrow circumferential minor groove is set narrower than that of the circumferential wide major groove. The tread has plural blocks which are zoned by the circumferential wide major groove, the transverse groove, and the narrow circumferential minor groove, the tread has a directional tread pattern in which each transverse groove being sequentially in contact with a road surface from a tire equatorial plane side toward the tread end during an on-load rotating operation. A width and a depth of the narrow circumferential minor groove in an area where the narrow circumferential minor groove zones the block are decreased from a kick-out side toward a stepping-on side of with respect to the block during the on-load rotating operation.

According to an aspect of the exemplary embodiments, the pneumatic tire has a directional pattern. Therefore, in the wet road surface driving, the water flows efficiently into the circumferential wide major groove, narrow circumferential minor groove, and transverse groove to obtain the high wet performance.

Because the high wet performance is obtained while the increase in negative ratio is suppressed, a wheel tread area of the block is secured to improve the wear-resistant property.

The handling performance is improved because the block rigidity is increased in the central region in the tire axis direction Furthermore, during the on-load rotating operation, the width and depth of the narrow circumferential minor groove are decreased from the kickout side toward the stepping-on side of the block in the range where the block is zoned by the narrow circumferential minor groove. Therefore, the block rigidity is increased at the stepping-on side of the block that is positioned on both sides of the narrow circumferential minor groove. This improves the traction performance, brake performance, and cornering performance.

As used herein, the term "central region in tire width direction of tread" shall mean a central region when the tread is equally divided into three regions in the tire axis direction.

Another aspect of the exemplary embodiments of the pneumatic tire provides that the at least two narrow circumferential minor grooves are provided on the outside in the tire axis direction of the circumferential wide major groove, and the transverse groove includes a first transverse groove, a second transverse groove, and a third transverse groove. The first transverse groove is extended from the tread end and is coupled to the circumferential wide major groove while intersecting with the narrow circumferential minor grooves. The second transverse groove is arranged between the first transverse grooves, the second transverse groove is extended from the tread end and intersects with the narrow circumferential minor grooves, the second transverse groove is terminated while not coupled to the circumferential wide major groove. The third transverse groove is arranged between the first transverse groove and the second transverse groove, is extended from the tread end and terminated between the two narrow circumferential minor grooves.

According to an aspect of the exemplary embodiments, the first transverse groove, the second transverse groove, and the third transverse groove are arranged in the tread. The first transverse groove is extended from the tread end, and the first transverse groove is coupled to the circumferential wide major groove while intersecting with the narrow circumferential minor groove. The second transverse groove is arranged between the first transverse grooves, the second transverse groove is extended from the tread end while intersecting with the narrow circumferential minor groove, and the second transverse groove is terminated while not coupled to the circumferential wide major groove. The third transverse groove is arranged between the first transverse groove and the second transverse groove, and the third transverse groove is extended from the tread end and terminated between the two narrow circumferential minor grooves. Therefore, the length in the tire circumferential direction of the block zoned by the grooves can be sequentially formed to become a half from the tire equatorial plane side toward the tread end, and the wet drainage property can be increased on both sides of the tread while the block rigidity can be increased on the tread central region side to increase the traction performance, brake performance, and cornering performance.

Another aspect of the exemplary embodiments provides that tire equatorial plane-side terminal positions of the second transverse groove and third transverse groove are located in a central region of a block in the tire axis direction.

The tire equatorial plane-side terminal positions of the second transverse groove and third transverse groove are located in the central region in the tire axis direction of the block where each of the second transverse groove and third transverse groove is arranged. Therefore, the high wet drainage property, roadholding ability, and wear-resistant property can be obtained in a preferable manner.

When the tire equatorial plane-side terminal positions of the second transverse groove and third transverse groove are shifted to the outside in the tire axis direction from the central region in the tire axis direction of the block, the water existing on the block surface hardly flows into each transverse groove, and thereby the wet drainage property is undesirably decreased.

When the tire equatorial plane-side terminal positions of the second transverse groove and third transverse groove are shifted to the inside (tire equatorial plane side) in the tire axis direction from the central region in the tire axis direction of the block, undesirably the block rigidity is lowered to decrease the traction performance, brake performance, and cornering performance.

As used herein, the term "central region of block in tire axis direction" shall mean a central region when the block is equally divided into three regions in the tire axis direction.

Another aspect of the pneumatic tire provides that, assuming that W2 is a groove width of the first transverse groove, W3 is a groove width of the second transverse groove, and W4 is a groove width of the third transverse groove, W3 is set in a range of 60% to 110% of W2 and W4 is set in a range of 20% to 60% of W2.

Assuming that W2 is a groove width of the first transverse groove, W3 is a groove width of the second transverse groove, and W4 is a groove width of the third transverse groove, W3 is set in a range of 60% to 110% of W2 and W4 is set in a range of 20% to 60% of W2. Therefore, a balance can be achieved between the wet drainage property and the block rigidity in the region surrounded by the first transverse groove and the second transverse groove.

The groove width W3 of the second transverse groove is set in a range of 60% to 110% of groove width W2 of the first transverse groove, which allows the groove width W3 of the second transverse groove to be approximately equalized to the groove width W2 of the first transverse groove to secure the high wet drainage property.

When the groove width W4 of the third transverse groove becomes lower than 20% of the groove width W2 of the first transverse groove, undesirably the wet drainage property is decreased in the region surrounded by the first transverse groove and the second transverse groove.

On the other hand, when the groove width W4 of the third transverse groove becomes more than 60% of the groove width W2 of the first transverse groove, undesirably the block rigidity is decreased in the region surrounded by the first transverse groove and the second transverse groove.

Another aspect of the exemplary embodiments provides that the at least two narrow circumferential minor grooves are provided on the outside of the circumferential wide major groove in the tire axis direction, the transverse groove includes a first transverse groove and a second transverse groove, the first transverse groove being extended from the tread end, the first transverse groove being coupled to the circumferential wide major groove while intersecting with the narrow circumferential minor grooves, the second transverse groove being arranged between the first transverse grooves, the second transverse groove being extended from the tread end, the second transverse groove intersecting with the narrow circumferential minor groove on an outermost side in the tire axis direction while not intersecting with the narrow circumferential minor groove on an innermost side in the tire axis direction, the second transverse groove being terminated while not coupled to the circumferential wide major groove. The first transverse groove has a bottom raising portion on a side that locates at the circumferential wide major groove side and a groove depth is gradually decreased from a start point provided at the outside with respect to the circumferential wide major groove toward the circumferential wide major groove in the tire axis direction at the bottom raising portion.

According to an aspect of the exemplary embodiments, in the wet road surface driving, the water near the central region in the tire axis direction flows into the circumferential wide major groove, and other water flows into the first transverse groove. The water on the wheel tread of the block surrounded by the circumferential wide major groove and first transverse groove flows into the two grooves of the narrow circumferential minor groove and the second transverse groove. The tread has the directional patter. Therefore, in the wet road surface driving, the water flows efficiently into the circumferential wide major groove, narrow circumferential minor groove, first transverse groove, and second transverse groove to obtain the high wet performance.

Because the high wet performance is obtained while the increase in negative ratio is suppressed, the wheel tread area of the block is secured to improve the wear-resistant property.

According to an aspect of the exemplary embodiments, the first transverse groove has the bottom raising portion at the circumferential wide major groove side thereof, and the groove depth is gradually decreased from the start point on the outside in the tire axis direction toward the circumferential wide major groove. Therefore, in the wet road surface driving, the water near the central region in the tire axis direction is distributed by the bottom raising portion into the water flowing, that is one flowing is toward into the circumferential wide major groove and the other flowing is toward into the first transverse groove, thereby the wet drainage property is further improved.

The bottom raising portion can suppress the generation of water turbulence in the circumferential wide major groove to improve the wet drainage property.

The bottom raising portion reinforces the blocks on both sides of the bottom raising portion, so that the block rigidity is increased in the tread central region to improve the traction performance, brake performance, and cornering performance.

As used herein, the term "first transverse groove is coupled to circumferential wide major groove" shall mean that the first transverse groove is opened to the circumferential wide major groove while the groove depth of the first transverse groove is not more than 10% of itself (not including groove depth of 0 mm), or, when the groove depth of the first transverse groove is 0 mm in the opening portion on the circumferential wide major groove side, the width of the first transverse groove is not more than 3 mm in the tire axis direction at the opening region where the groove depth is 0 mm.

Another aspect of the exemplary embodiments provides that a length of the bottom raising portion in the tire axis direction is set in the range of 60 to 200% of a groove width of the circumferential wide major groove.

The size of the bottom raising portion in the tire axis direction is set in the range of 60 to 200% of the groove width of the circumferential wide major groove. Therefore, the wet drainage property can securely be improved by achieving an excellent balance between an amount of water flowing into the circumferential wide major groove and an amount of water flowing into the first transverse groove.

Another aspect of the exemplary embodiments provides that a depth of a top portion of the bottom raising portion is set to 10% or less of a groove depth of the first transverse groove when each depth is measured from a wheel tread surface of the tread.

When the depth of the top portion of the bottom raising portion is more than 10% of the groove depth of the first transverse groove in measuring the depth from the wheel tread surface (namely, when the groove depth in the bottom raising portion of the first transverse groove is more than 10% of the groove depth of the portions except for the bottom raising portion), the turbulence is generated in the water flowing in the circumferential wide major groove to decrease the wet drainage property, and the block rigidity is decreased in the tread central region (because the block reinforcement effect by the bottom raising portion is decreased). Therefore the traction performance, brake performance, and cornering performance cannot be improved.

Another aspect of the exemplary embodiments provides that the groove width of the second transverse groove is set in the range of 10 to 80% of the groove width of the first transverse groove.

The groove width of the second transverse groove is set in the range of 10 to 80% of the groove width of the first transverse groove, which allows a balance to be achieved between the wet drainage property and the block rigidity of the outside region in the tire axis direction of the tread.

When the groove width of the second transverse groove is lower than 10% of the groove width of the first transverse groove, a shortage of the groove volume is generated in the second transverse groove to decrease the wet drainage property.

On the other hand, when the groove width of the second transverse groove exceeds 80% of the groove width of the first transverse groove, because the wheel tread area is decreased in the outside region in the tire axis direction of the tread, the block rigidity is decreased to affect the cornering performance.

Another aspect of the exemplary embodiments provides that the narrow circumferential minor groove arranged on the outermost side in the tire axis direction is inclined toward a direction in which the narrow circumferential minor groove is sequentially in contact with the road surface from the tire equatorial plane side toward the tread end of the narrow circumferential minor groove during the on-load rotating operation.

In the plural narrow circumferential minor grooves, the narrow circumferential minor groove arranged on the outside in the tire axis direction is inclined toward the direction in which the narrow circumferential minor groove is sequentially in contact with the road surface from the tire equatorial plane side toward the tread end during the on-load rotating operation. Therefore, the wet drainage performance is improved near both the outsides in the tire axis direction in the tire ground contact portion.

Another aspect of the exemplary embodiments provides that, in the narrow circumferential minor groove, a groove wall on the tire equatorial plane side is linearly extended in the tire circumferential direction and has an angle with respect to a normal set to the wheel tread ranges from 40 degrees to 80 degrees.

The groove wall on the tire equatorial plane side of the narrow circumferential minor groove is linearly extended in the tire circumferential direction, and the angle with respect to the normal set to the wheel tread is set in the range of 40 degrees to 80 degrees (measured on the included angle side). Therefore, a balance can be achieved between the block rigidity of the block at the tire equatorial plane side of the narrow circumferential minor groove and the wet drainage property of the narrow circumferential minor groove.

When the angle with respect to the normal set to the wheel tread becomes lower than 40 degrees in the groove wall at the tire equatorial plane side of the narrow circumferential minor groove, undesirably the block rigidity is decreased on the tire equatorial plane side of the narrow circumferential minor groove.

On the other hand, when the angle with respect to the normal set to the wheel tread becomes exceeds 80 degrees in the groove wall at the tire equatorial plane side of the narrow circumferential minor groove, undesirably a shortage of the groove volume is generated in the narrow circumferential minor groove to decrease the wet drainage property.

Another aspect of the exemplary embodiments provides that, in the narrow circumferential minor groove, the groove wall at the tire equatorial plane side is coupled to the opposing groove wall at the outside in the tire axis direction at the stepping-on side with respect to the block.

In the narrow circumferential minor groove, on the kickout side of the block, the groove wall at the tire equatorial plane side is not coupled to the opposing groove wall at the outside in the tire axis direction. However, on the stepping-on side of the block, the groove was on the tire equatorial plane side is coupled to the opposing groove wall on the outside in the tire axis direction.

The groove wall on the tire equatorial plane side is coupled to the opposing groove wall on the outside in the tire axis direction. Therefore, the block rigidity can be enhanced on the outside of the narrow circumferential minor groove in the tire axis direction to improve the traction performance, brake performance, and cornering performance.

Another aspect of a pneumatic tire has plural grooves including a transverse groove in a tread, the transverse groove being extended while inclined with respect to a tire circumferential direction, and a bottom raising portion which raises the bottom of the transverse groove is formed on one side of the transverse groove in a tire width direction, and thereby the transverse groove is substantially opened to and terminated in another groove which is adjacent to the transverse groove on the one side in the tire width direction, the transverse groove is completely opened to other groove which is adjacent to the transverse groove on the other side in the tire width direction or the transverse groove is completely opened to a tread end, and the bottom raising portion forms an inclined surface at the grove bottom surface, a depth of the transverse groove to the inclined surface being gradually decreased from the other side to a top portion of the bottom raising portion in the tire width direction.

As used herein, the term "transverse groove is substantially opened to and terminated in another groove" shall mean that the terminal of the transverse groove is opened to another groove while the depth of the transverse groove is not more than 20% of the maximum depth thereof, or a portion whose groove depth is 0 mm is formed in the terminal and the length (width) in the tire width direction is not more than 3 mm in the portion where the groove depth is 0 mm.

The term "transverse groove is completely opened to other groove" shall mean that the transverse groove is opened while the opening depth of the transverse groove is larger than 20% of the maximum depth.

According to an aspect of the exemplary embodiments, the directional tread wheel pattern is formed in the wheel tread portion and the bottom raising portion is formed in the transverse groove. Therefore, in the wet road surface driving, the water near the bottom raising portion is distributed into the water flow, one flows into another groove on one side in the tire width direction (one side in tire axis direction) of the transverse groove and the other flows toward the other side in tire width direction through the transverse groove caused by the inclined surface. Therefore, the pneumatic tire having the excellent wet drainage property can be obtained.

The roadholding ability on the dry road surface, uneven wear-resistant property, and pattern noise property are improved because the rigidity is enhanced in the corner portion of the adjacent land portion by the bottom raising portion provision. This effect is remarkably exhibited in the corner portion which has an acute angle when viewed from the tire surface side, i.e., from the wheel tread side.

When one side in tire width direction of the transverse groove is opened to another groove at the position where the depth of the transverse groove is deeper than 20% of the maximum depth thereof, undesirably the block rigidity is decreased in the tread central region to decrease the traction performance, brake performance, and cornering performance while the turbulence is generated in the water flowing in another groove to decrease the wet drainage property. When the portion whose groove depth is 0 mm is formed in the one side in tire width direction of the transverse groove and, at the same time, the length (width) in the tire width direction is not more than 3 mm in the portion where the groove depth is 0 mm, undesirably a shortage of the groove volume is generated in the transverse groove to decrease the drainage property in the wet road surface. The unfavorable property is not generated because the one side in tire width direction of the transverse groove is substantially opened to and terminated in another groove. The plural grooves include at least the transverse groove, and the plural grooves may include the groove except for the transverse groove, e.g., the circumferential major groove. Another groove may be extended along the tire circumferential direction or another groove may be inclined with respect to the tire circumferential direction.

Another aspect of the exemplary embodiments provides that the transverse grooves may be formed at substantially equal intervals.

Another aspect of the exemplary embodiments provides that a length of a groove portion which has the inclined surface as a groove bottom surface is set in the range of 5 to 100% of a groove length of the transverse groove having the groove portion.

When the groove portion is shorter than 5% of the groove length of the transverse groove having the groove portion, the rigidity is decreased in the corner portion of the land portion adjacent to the bottom raising portion, and sometimes undesirably the roadholding ability on the dry road surface, uneven wear-resistant property, and pattern noise property are largely decreased. In the corner portions, this is remarkably exhibited in the corner portion which has an acute angle when viewed from the wheel tread side. When the groove portion is longer than 100% of the groove length of the transverse groove having the groove portion, the inclined surface is projected to another groove (such as the circumferential major groove) to obstruct the water flow in another groove, and undesirably the wet drainage property is decreased.

According to an aspect of the exemplary embodiments, the undesirable property is not generated because the groove length of the groove portion ranges from 5 to 100% of the groove length of the transverse groove.

Another aspect of the exemplary embodiments provides that the tread includes a circumferential major groove which is extended along the tire circumferential direction, a cross section of the bottom raising portion in a longitudinal direction of the groove is formed in a chevron shape, a one side inclined surface is formed as the grove bottom surface at the bottom raising portion, the groove depth is gradually increased from the top portion to the one side at the one-end-side inclined surface in tire width direction, a land portion adjacent to the transverse groove has an edge portion at the one side, the edge portion has an edge surface which is provided along the circumferential major groove and is chamfered in a tapered shape so that the edge surface forms the same surface as the one side inclined surface, and inclination angles of the one side inclined surface and the edge surface range from 30 to 60° with respect to a line parallel to a tire radial direction.

According to an aspect of the exemplary embodiments, the one side inclined surface has the same surface as the edge surface. Therefore, the rigidity is enhanced in the edge portion to improve the roadholding ability or uneven wear-resistant property in the dry road surface and wet road surface. In the wet road surface driving, the wet drainage property is further improved because the water on the land portion surface near the edge portion flows into circumferential major groove without generating the turbulence.

The one side inclined surface has the same surface as the edge surface, and the groove bottom terminal formed by the bottom raising portion coincides with the edge end of the edge surface at the circumferential major groove. Therefore, the water flows in the circumferential major groove while distributed without generating the turbulence. This also contributes to the improvement of the wet drainage property.

When the inclination angle is lower than 30°, in the wet road surface driving, undesirably the turbulence is generated when the water on the land portion surface near the edge portion flows into the circumferential major groove, and the wet drainage property is easily decreased. When the inclination angle is larger than 60°, because a shortage of the groove volume is easily generated in the circumferential major groove adjacent to the edge portion, undesirably the wet drainage property is easily decreased in the wet road surface driving. According to an aspect of the exemplary embodiments, the above trouble is never generated because the inclination angle is set in the range of 30 to 60°.

Effect of the Invention

Because the pneumatic tire of the invention has the above configurations, the pneumatic tire has the excellent effect that the high wet drainage performance can be obtained without sacrificing other capabilities.

BRIEF DESCRIPTION OF THE DRAWINGS

FIG. 2A is an enlarged plan view of the tread;

FIG. 2B is a sectional view taken on line 2B-2F of a first narrow circumferential minor groove;

FIG. 2C is a sectional view taken on line 2C-2C of the first narrow circumferential minor groove;

FIG. 2D is a sectional view taken on line 2D-2D of a second narrow circumferential minor groove;

FIG. 2E is a sectional view taken on line 2E-2E of the second narrow circumferential minor groove;

FIG. 4A is an enlarged plan view of the tread;

FIG. 4B is a sectional view taken on line 4B-4B of a first narrow circumferential minor groove;

FIG. 4C is a sectional view taken on line 4C-4C of the first narrow circumferential minor groove;

FIG. 4D is a sectional view taken on line 4D-4D of a second narrow circumferential minor groove;

FIG. 4E is a sectional view taken on line 4E-4E of the second narrow circumferential minor groove;

FIG. 8A is a plan view showing a tread of a pneumatic tire according to the third embodiment;

FIG. 8B is a sectional view taken on line 8B-8B of FIG. 8A;

BEST MODE FOR CARRYING OUT THE INVENTION

First Embodiment

A first embodiment of a pneumatic tire of the invention will be described in detail with reference to the drawings.

Figure 1:
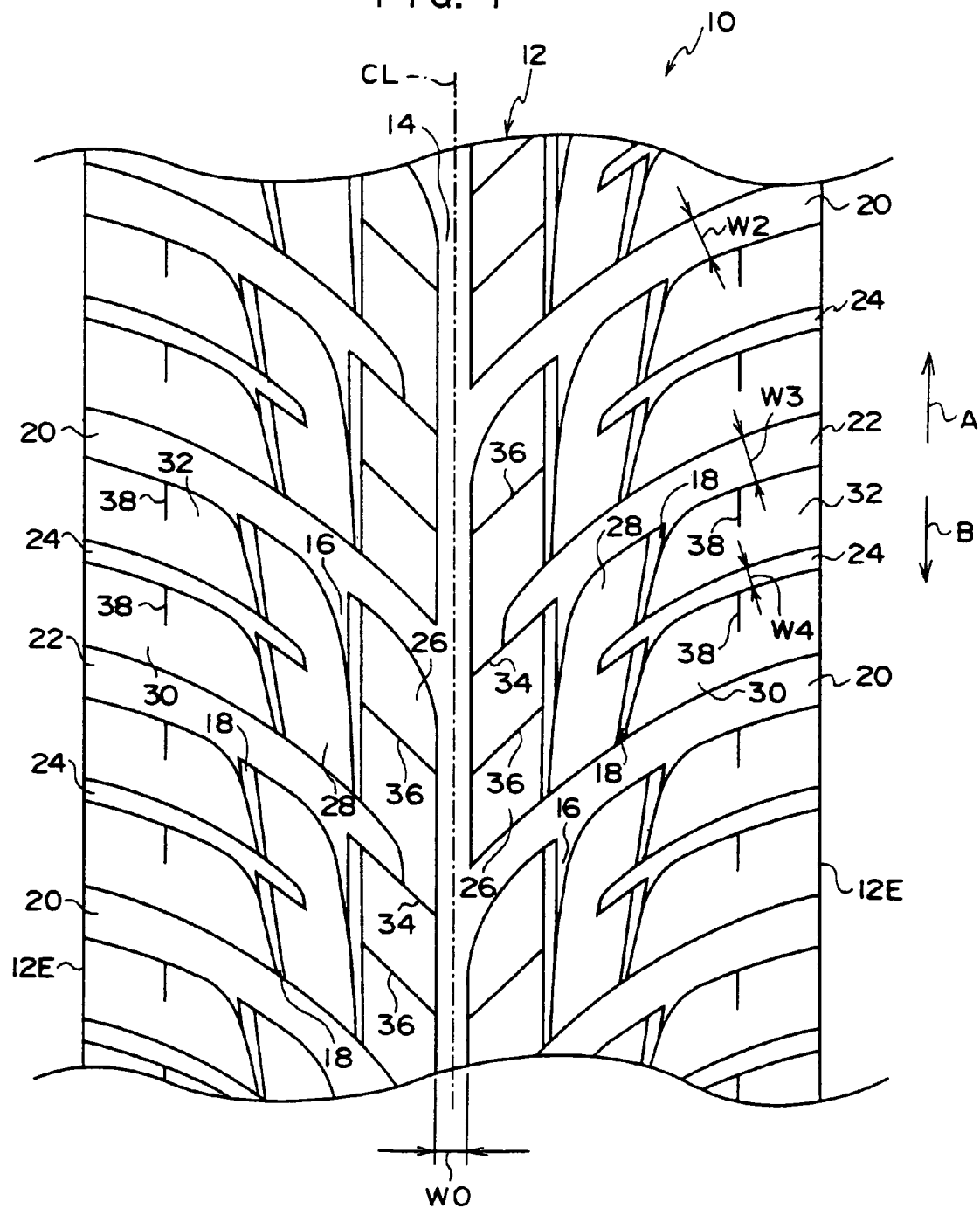
FIG. 1 is a plan view showing a tread of a pneumatic tire according to a first embodiment of the invention.

As shown in FIG. 1, a circumferential wide major groove 14 is formed on a tire equatorial plane CL in a tread 12 of a pneumatic tire 10 of the first embodiment. The circumferential wide major groove 14 is linearly extended in a tire circumferential direction (directions of arrows A and B, the direction of arrow B is a tire rotating direction). First narrow circumferential minor grooves 16 extended in the tire circumferential direction are formed on the outside in a tire axis direction with respect to the circumferential wide major groove 14. Second narrow circumferential minor grooves 18 extended in the tire circumferential direction are further formed on the outside in the tire axis direction with respect to the first narrow circumferential minor grooves 16.

As shown in FIG. 2A, a groove wall 16A on the side of the tire equatorial plane CL of the first narrow circumferential minor groove 16 is linearly extended in the tire circumferential direction. In a groove wall 16B on the outside in the tire axis direction of the first narrow circumferential minor groove 16, an inclination angle of the groove wall 16B with respect to the tire circumferential direction is increased from a stepping-on side toward a kickout side such that a distance (groove width) with the groove wall 16A is widened.

As shown in FIG. 2B, in the groove wall 16A on the side of the tire equatorial plane CL of the first narrow circumferential minor groove 16, it is preferable that a groove wall angle $\theta_{16A}$ with respect to a normal HL to a wheel tread 12A of the tread 12 range from 40 degrees to 80 degrees. In the first embodiment, the groove wall angle $\theta_{16A}$ is set at 60 degrees.

In the first narrow circumferential minor groove 16, a groove wall angle $\theta_{16B}$ of the groove wall 16B with respect to the normal HL is set at 5 degrees.

As shown in FIGS. 2A and 2C, the groove wall 16A is in contact with the groove wall 16B in the area of a substantially central portion to the stepping-on side of the first narrow circumferential minor groove 16. As shown in FIG. 2C, a groove shape in cross section has a substantial V-shape in a portion where the groove wall 16A is in contact with the groove wall 16B.

In the first narrow circumferential minor groove 16 shown in FIGS. 2A and 2B, the portion where groove wall 16A is not in contact with the groove wall 16B exhibits a reversal trapezoid while having a flat groove bottom 16C. The flat groove bottom 16C is parallel to the wheel tread 12A of the tread 12 and is provided between a lower end of the groove wall 16A and a lower end of the groove wall 16B as shown in FIG. 2B.

The groove depth is increased toward the kickout side (direction of arrow A) in the portion where the groove wall 16A and groove wall 16B of the first narrow circumferential minor groove 16 are in contact with each other.

As shown in FIG. 1, the second narrow circumferential minor grooves 18 is inclined with respect to the tire circumferential direction so as to sequentially come into contact with the road surface from the side of the tire equatorial plane CL toward the tread end 12E during an on-load rotating operation.

As shown in FIG. 2A, in the second narrow circumferential minor groove 18, an angle (inclination angle α) of the groove wall 18A on the side of the tire equatorial plane CL with respect to the tire circumferential direction is kept constant over the entire length. On the other hand, in the groove wall 18B on the outside in the tire axis direction, an angle with respect to the tire circumferential direction is increased toward the kickout side.

In the groove wall 18A of the second narrow circumferential minor groove 18, it is preferable that the inclination angle α range from 3 degrees to 20 degrees.

As shown in FIG. 2D, as with the first narrow circumferential minor groove 16, in the second narrow circumferential minor groove 18, it is preferable that the angle $\theta_{18A}$ of the groove wall 18A with respect to the normal HL to the wheel tread 12A range from 40 degrees to 80 degrees. In the first embodiment, the groove wall angle $\theta_{18A}$ is set at 60 degrees.

In the groove wall 18B of the second narrow circumferential minor groove 18, the groove wall angle $\theta_{18B}$ with respect to the normal HL is set at 5 degrees.

As shown in FIGS. 2A and 2E, as with the first narrow circumferential minor groove 16, the groove wall 18A is in contact with the opposing groove wall 18B in the range of the substantial central portion to the stepping-on side of the second narrow circumferential minor groove 18. As with the first narrow circumferential minor groove 16, the groove shape in cross section has a substantial V-shape in a portion where the groove wall 18A is in contact with the groove wall 18B.

As shown in FIGS. 2A and 2D, in the second narrow circumferential minor groove 18, the portion where the groove wall 18A is not in contact with the groove wall 18B exhibits a flat groove bottom. The flat groove bottom is parallel to the wheel tread 12A of the tread 12 and is provided between a lower end of the groove wall 18A and a lower end of the groove wall 18B.

As with the first narrow circumferential minor groove 16, in the second narrow circumferential minor groove 18, the groove depth is increased toward the kickout side in the area where the groove wall 18A and groove wall 18B are in contact with each other.

That is, in both the first narrow circumferential minor groove 16 and the second narrow circumferential minor groove 18, the kick-out side is larger than the step-in side in the groove width and the groove depth.

As shown in FIG. 1, first transverse grooves 20, second transverse grooves 22, and third transverse grooves 24 are formed in the tread 12. The first transverse groove 20 is extended from the tread end 12E toward the tire equatorial plane CL, and the first transverse groove 20 is coupled to the circumferential wide major groove 14 while intersecting with the first narrow circumferential minor groove 16 and the second narrow circumferential minor groove 18. The second transverse groove 22 is arranged between the first transverse grooves 20, and the second transverse groove 22 is extended from the tread end 12E toward the tire equatorial plane CL. The second transverse groove 22 intersects with the first narrow circumferential minor groove 16 and the second narrow circumferential minor groove 18, and the second transverse groove 22 is terminated without coupling to the circumferential wide major groove 14. The third transverse groove 24 is arranged between the first transverse groove 20 and the second transverse groove 22, the third transverse groove 24 is extended from the tread end 12E toward the tire equatorial plane CL, and the third transverse groove 24 is terminated between the first narrow circumferential minor groove 16 and the second narrow circumferential minor groove 18.

The first transverse grooves 20, the second transverse grooves 22, and the third transverse grooves 24 are inclined with respect to the tire circumferential direction so as to sequentially come into contact with the road surface from the side of the tire equatorial plane CL toward the tread end 12E during the on-load rotating operation.

The tread 12 is zoned into a first block 26, a second block 28, a stepping-on-side third block 30, and a kickout-side third block 32. The first blocks 26 are zoned on both sides of the circumferential wide major groove 14 in the tire axis direction by the circumferential wide major groove 14, the first narrow circumferential minor groove 16, the first transverse groove 20, and the second transverse groove 22. The second block 28 is zoned on the outside of the first block 26 in the tire axis direction by the first narrow circumferential minor groove 16, the second narrow circumferential minor groove 18, the first transverse groove 20, the second transverse groove 22, and the third transverse groove 24. The stepping-on-side third block 30 and the kickout-side third block 32 are located on the outside of the second block 28 in the tire axis direction. The stepping-on-side third block 30 is zoned by the second narrow circumferential minor groove 18, the first transverse groove 20, and the third transverse groove 24. The kickout-side third block 32 is zoned by the second narrow circumferential minor groove 18, the second transverse groove 22, and the third transverse groove 24.

A tire equatorial plane-side end portion of the second transverse groove 22 is terminated at a central portion of the first block 26 in the tire axis direction, and a tire equatorial plane-side end portion of the third transverse groove 24 is terminated at a central portion of the second block 28 in the tire axis direction.

At this point, assuming that W2 is the groove width of the first transverse groove 20, W3 is the groove width of the second transverse groove 22, and W4 is the groove width of the third transverse groove 24, preferably W3 is set in the range of 60% to 110% of W2 while W4 is set in the range of 20% to 60% of W2.

In the first embodiment, the groove width W3 of the second transverse groove 22 is set in the range of 64 to 100% of the groove width W2 of the first transverse groove 20, and the groove width W4 of the third transverse groove 24 is set in the range of 28 to 42% of the groove width W2 of the first transverse groove 20.

A first transverse siping 34 is formed in a circumferential central portion of the first block 26, and the first transverse siping 34 couples the second transverse groove 22 and the circumferential wide major groove 14. In the first block 26, a second transverse siping 36 is also formed between the first transverse siping 34 and the first transverse groove 20, and the second transverse siping 36 couples the first narrow circumferential minor groove 16 and the circumferential wide major groove 14.

Longitudinal sipings 38 are formed in the stepping-on-side third block 30 and the kickout-side third block 32 respectively. The longitudinal siping 38 is extended from a kickout edge toward the stepping-on side, and the longitudinal siping 38 is terminated at a block central portion.

(Action)

The tread pattern of the pneumatic tire 10 of the first embodiment is formed in a directional pattern. Therefore, in the wet road surface driving, the water between the pneumatic tire 10 and the road surface flows efficiently into the circumferential wide major groove 14, the first narrow circumferential minor groove 16, the second narrow circumferential minor groove 18, the first transverse groove 20, the second transverse groove 22, and the third transverse groove 24, and the high wet performance is obtained while the increase in negative ratio is suppressed. Because the high wet performance is obtained while the increase in negative ratio is suppressed, the wheel tread area can be secured in each block to increase the wear-resistant property.

A circumferential length of the second block 28 becomes a substantial half of the first block 26, and each of the circumferential lengths of the stepping-on-side third block 30 and kickout side third block 32 becomes a substantial half of the second block 28. Therefore, the wet drainage property can be improved on both the sides of the tread while the block rigidity can be increased on the tread central region to improve the traction performance, brake performance, and cornering performance. Furthermore, when the pneumatic tire 10 of the first embodiment is used in a front wheel, the handling performance is improved by increasing the block rigidity of the central region in the tire axis direction.

In the range where the block is zoned by the first narrow circumferential minor groove 16 and the second narrow circumferential minor groove 18, the widths and the depths of the first and second narrow circumferential minor grooves 16 and 18 are decreased from the kickout side toward the stepping-on side of the block during the on-load rotating operation. Therefore, the block rigidity of the stepping-on side is increased to improve the traction performance, brake performance, and cornering performance in the block adjacent to the first narrow circumferential minor groove 16 and the second narrow circumferential minor groove 18.

The tire equatorial plane-side terminal position of the second transverse groove 22 is located at the central region of the first block 26 in the tire axis direction, and the tire equatorial plane-side terminal position of the third transverse groove 24 is located at the central region of the second block 28 in the tire axis direction. Therefore, the water existing on the wheel tread of each block can efficiently be drained, and the block wheel tread area (related to wear-resistant property) and the block rigidity (related to roadholding ability) can be secured while the high wet drainage performance is obtained. Accordingly, the high wet drainage performance, roadholding ability, and wear-resistant property can be obtained in a preferable manner.

The groove wall 16A on the side of the tire equatorial plane CL of the first narrow circumferential minor groove 16 is linearly extended in the tire circumferential direction, and the angle $\theta_{16A}$ with respect to the normal to the wheel tread 12A is set in the range of 50 degrees to 80 degrees. Therefore, a balance can be achieved between the rigidity of the first block 26 that is provided at the tire equatorial plane CL side with respect to the first narrow circumferential minor groove 16 and the wet drainage property of the first narrow circumferential minor groove 16.

At the block stepping-on side of the first narrow circumferential minor groove 16, the groove wall 16A at the side of the tire equatorial plane CL is coupled to the opposing groove wall 16B at the outside in the tire axis direction. Therefore, the rigidity can be enhanced to improve the traction performance, brake performance, and cornering performance in the second block 28 that is provided at the outside of the first narrow circumferential minor groove 16 in the tire axis direction.

Similarly, at the block stepping-on side of the second narrow circumferential minor groove 18, the groove wall 18A on the side of the tire equatorial plane CL is coupled to the opposing groove wall 18B on the outside in the tire axis direction. Therefore, the rigidity can be enhanced in the third block 30 that is provided at the outside of the second narrow circumferential minor groove 18 in the tire axis direction.

The groove width W3 of the second transverse groove 22 is set in the range of 60% to 110% of the groove width W2 of the first transverse groove 20, and the groove width W4 of the third transverse groove 24 is set in the range of 20% to 60% of the groove width W2 of the first transverse groove 20. Therefore, a balance can be achieved between the wet drainage property and the block rigidity in the region surrounded by the first transverse groove 20 and the second transverse groove 22.

The groove width W3 of the second transverse groove 22 is set substantially equal to the groove width W2 of the first transverse groove 20, namely, the groove width W3 of the second transverse groove 22 is set in the range of 60% to 110% of the groove width W2 of the first transverse groove 20, which secures the high wet drainage property.

The second narrow circumferential minor groove 18 arranged in the outermost side in the tire axis direction is inclined so as sequentially come into contact with the road surface from the side of the tire equatorial plane CL toward the tread end 12E during the on-load rotating operation. Therefore, the wet drainage performance is improved near both the outsides in the tire axis direction of the tire ground contact surface portion.

Accordingly the pneumatic tire 10 of the first embodiment is suitable for the use of the racing ultra-high performance vehicle front-tire.

The wet drainage performance cannot be improved when the inclination angle α is lower than three degrees in the groove wall 18A of the second narrow circumferential minor groove 18.

On the other hand, when the inclination angle α is more than 20 degrees, the block end at the kick-out side of the second block 28 that is adjacent to the second transverse groove 22 becomes an acute angle, which results in the undesirable shortage of the block rigidity.

Test Example

A tire of Conventional example and a tire of the present Example are attached to the front wheel of the actual vehicle, and a test is performed to confirm the effect of the invention. In the test, the tire of Example is compared to the tire of Conventional example for the hydroplaning, wet circuit lap time, and wet grip.

Hydroplaning: the vehicle runs on the wet road surface whose water depth is 2 mm, and hydroplaning generation speed is measured. The evaluation is displayed as an index in which the hydroplaning generation speed is set at 100 in the conventional tire. As the index is increased, the hydroplaning generation speed is enhanced. Therefore, the higher index indicates that the tire has the excellent wet drainage property.

Wet circuit lap time: a lap time is measured when the vehicle runs round on the wet road surface (test course) whose water depth is 2 mm. The evaluation is displayed as an index in which the lap time is set at 100 in the conventional tire. As the index is decreased, the lap time is shortened. Therefore, the lower index indicates that the tire has the excellent wet circuit running property.

Wet grip: a feeling evaluation is performed by a test driver when the vehicle runs round on the wet road surface (test course) whose water depth is 2 mm. The evaluation is displayed as an index in which the feeling is set at 100 in the conventional tire. As the index is increased, the tire has the excellent wet grip.

The tire of Example: the pneumatic tire of the above-described first embodiment is used.

Figure 16:
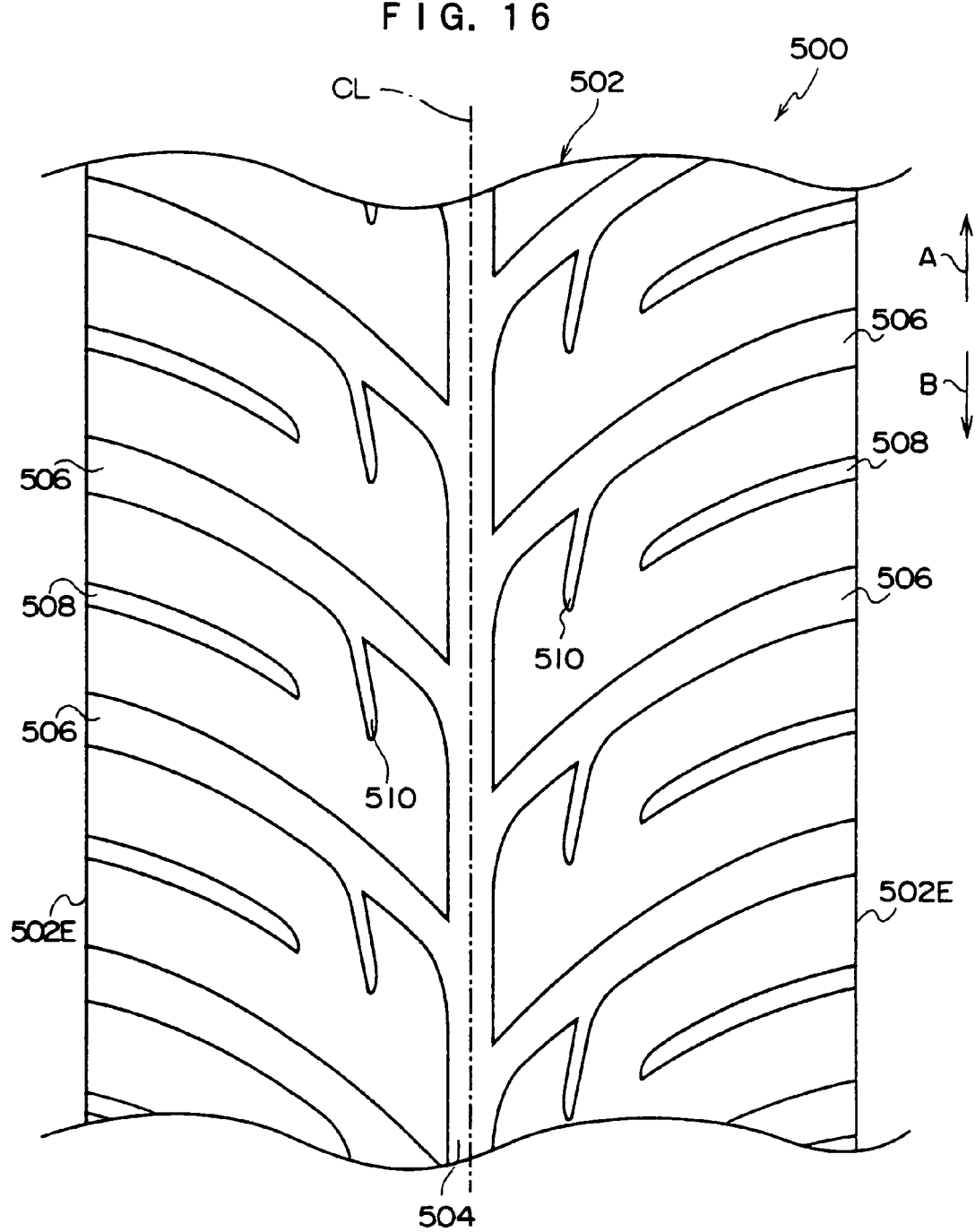
FIG. 16 is a plan view showing a tread of a conventional pneumatic tire.

The tire of Conventional example: a pneumatic tire having a tread pattern shown in FIG. 16 is used.

As shown in FIG. 16, in a tread 502 of a pneumatic tire 500 of Conventional example, a circumferential wide major groove 504 is formed on the tire equatorial plane CL.

In the tread 502, plural first transverse grooves 506 are formed on both sides of the circumferential wide major groove 504. The first transverse groove 506 is extended from a tread end 502E toward the circumferential wide major groove 504, and the first transverse groove 506 is coupled to the circumferential wide major groove 504. A second transverse groove 508 is formed between the first transverse grooves 506. The second transverse groove 508 is extended from the tread end 502E toward the circumferential wide major groove 504, and the second transverse groove 508 is terminated at a middle portion between the tire equatorial plane CL and the tread end 502E.

A minor groove 510 is coupled to the middle portion of the first transverse groove 506. The minor groove 510 is extended toward the stepping-on side and the minor groove 510 is terminated in the block.

Sizes are RAR 265/55R13 (tread width is 200 mm) in the tires of Conventional example and Example. Table 1 shows specifications of each tire.

Test vehicle wheel alignment:
front-wheel toe angle (toe-out side) of 1 mm and negative camber angle of 4°, rear-wheel toe angle (toe-in side) of 1 mm and negative camber angle of 3° Table 2 shows the test results.

TABLE 1

|  | Conventional example | Example |
|---|---|---|
| Circumferential wide major groove: groove depth D0 (mm) | 2.8 | 2.8 |
| Circumferential wide major groove: groove width W0 (mm) | 13 | 13 |
| First and second narrow circumferential minor grooves: groove depth D1 (mm) | — | 1.3 to 2.8 |
| First and second narrow circumferential minor grooves: groove width W1 (mm) of middle portion | — | 4.0 |
| Circumferential inclination angle α (degree) to tire equatorial plane-side groove wall of second narrow circumferential minor groove | — | 8 |
| First transverse groove: groove depth D2 | 2.8 | 2.8 |
| First transverse groove: groove width W2 | 12 to 20 | 14 to 19 |
| Second transverse groove: groove depth D3 | — | 2.8 |
| Second transverse groove: groove width W3 | — | 9 to 19 |
| Third transverse groove: groove depth D4 | 2.8 | 2.8 |
| Third transverse groove: groove width W4 | 6 to 9 | 4 to 8 |

TABLE 2

| Name | Conventional example | Example |
|---|---|---|
| Hydroplaning | 100 | 110 |
| Wet circuit lap time | 100 | 96 |
| Wet grip | 100 | 120 |

As can be seen from the test results, in the pneumatic tire of Example to which the invention is applied, all the hydroplaning, wet circuit lap time, and wet grip are improved compared with the pneumatic tire of Conventional example.

Second Embodiment

A second embodiment of a pneumatic tire of the invention will be described in detail with reference to the drawings.

Figure 3:
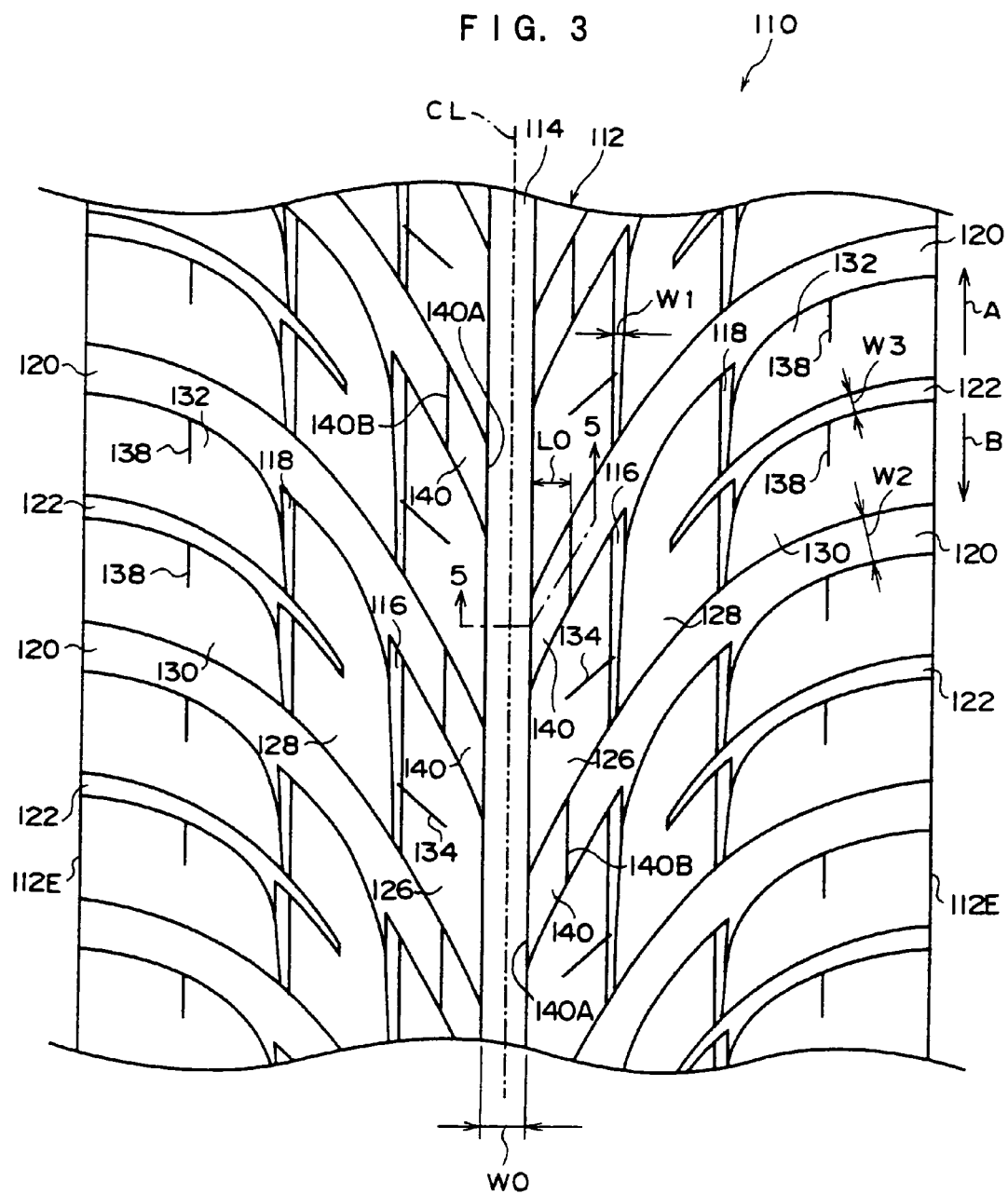
FIG. 3 is a plan view showing a tread of a pneumatic tire according to a second embodiment of the invention.

As shown in FIG. 3, a circumferential wide major groove 114 is formed on the tire equatorial plane CL in a tread 112 of a pneumatic tire 110 of the second embodiment. The circumferential wide major groove 114 is linearly extended in the tire circumferential direction. First narrow circumferential minor grooves 116 extended in the tire circumferential direction are formed on the outside of the circumferential wide major groove 114 in a tire axis direction. Second narrow circumferential minor grooves 118 extended in the tire circumferential direction are further formed on the outside of the first narrow circumferential minor grooves 116 in the tire axis direction.

As shown in FIG. 4A, a groove wall 116A of the first narrow circumferential minor groove 116 that is provided at the tire equatorial plane CL side is linearly extended in the tire circumferential direction. In a groove wall 116B of the first narrow circumferential minor groove 116 provided at the outside in the tire axis direction, the inclination angle of the groove wall 116B with respect to the tire circumferential direction is increased from the stepping-on side toward the kickout side such that a distance (groove width) formed between the groove wall 116A and the groove wall 116B is widened.

As shown in FIG. 4B, in the groove wall 116A, it is preferable that the groove wall angle $\theta_{16A}$ with respect to the normal HL to a wheel tread 112A of the tread 112 range from 50 degrees to 80 degrees. In the second embodiment, the groove wall angle $\theta_{16A}$ is set at 60 degrees.

In the first narrow circumferential minor groove 116, the groove wall angle $\theta_{16B}$ of the groove wall 116B is set at 5 degrees.

As shown in FIGS. 4A and 4C, the groove wall 116A is in contact with the groove wall 116B in the area of the substantially central portion to the stepping-on side of the first narrow circumferential minor groove 116. As shown in FIG. 4C, the groove shape in cross section has the substantial V-shape in a portion where the groove wall 116A is in contact with the groove wall 116B.

In the first narrow circumferential minor groove 116 shown in FIGS. 4A and 4B, the portion where groove wall 116A is not in contact with the groove wall 116B exhibits a reversal trapezoid while having a flat groove bottom 116C. The flat groove bottom 116C is parallel to the wheel tread 112A of the tread 112 and is provided between a lower end of the groove wall 116A and a lower end of the groove wall 116B as shown in FIG. 4B.

The groove depth is increased toward the kickout side in the portion where the groove wall 116A and groove wall 116B are in contact with each other in the first narrow circumferential minor groove 116.

As shown in FIG. 4A, as with the groove wall 116A of the first narrow circumferential minor groove 116, a groove wall 118A at the tire equatorial plane CL side of a second narrow circumferential minor groove 118 is linearly extended in the tire circumferential direction. In the groove wall 118B provided at the outside of the second narrow circumferential minor groove 118 in the tire axis direction, the inclination angle with respect to the tire circumferential direction is increased from the stepping-on side toward the kickout side such that the distance (groove width) formed between the groove wall 118A and the groove wall 118B is widened.

As shown in FIG. 4D, as with the first narrow circumferential minor groove 116, in the second narrow circumferential minor groove 118, it is preferable that in the groove wall 118A, the angle $\theta_{18A}$ with respect to the normal HL to the wheel tread 112A range from 50 degrees to 80 degrees. In the second embodiment, the groove wall angle $\theta_{18A}$ is set at 60 degrees.

In the groove wall 118B of the second narrow circumferential minor groove 118, the groove wall angle $\theta_{18B}$ is set at 5 degrees.

As shown in FIGS. 4A and 4D, as with the first narrow circumferential minor groove 116, the groove wall 118A is in contact with the opposing groove wall 118B in the area of the substantial central portion to the stepping-on side in the second narrow circumferential minor groove 118. As with the first narrow circumferential minor groove 116, the groove shape in cross section has the substantial V-shape in the portion where the groove wall 118A is in contact with the groove wall 118B.

As shown in FIGS. 4A and 4E, as with the first narrow circumferential minor groove 116, in the second narrow circumferential minor groove 118, the portion where groove wall 118A is not in contact with the groove wall 118B has the flat groove bottom that is parallel to the wheel tread 112A of the tread 112. The flat groove bottom is formed between the lower end of the groove wall 118A and the lower end of the groove wall 118B.

As with the first narrow circumferential minor groove 116, the groove depth is increased toward the kickout side in the portion where the groove wall 118A and groove wall 118B are in contact with each other in the second narrow circumferential minor groove 118.

That is, in both the first narrow circumferential minor groove 116 and the second narrow circumferential minor groove 118, the stepping-on side is larger than the kickout side in the groove width and the groove depth. Therefore, the block rigidity is secured while the drainage property is improved.

As shown in FIG. 3, first transverse grooves 120 and second transverse grooves 122 are formed in the tread 112. The first transverse groove 120 is extended from the tread end 112E toward the tire equatorial plane CL, and the first transverse groove 120 is coupled to the circumferential wide major groove 114 while intersecting with the first narrow circumferential minor groove 116 and the second narrow circumferential minor groove 118. The second transverse groove 122 is arranged between the first transverse grooves 120, and the second transverse groove 122 is extended from the tread end 112E toward the tire equatorial plane CL. The second transverse groove 122 intersects with the second narrow circumferential minor groove 118, and the second transverse groove 122 is terminated in the middle portion between the first narrow circumferential minor groove 116 and the second narrow circumferential minor groove 118.

The tread 112 is zoned into a first block 126, a second block 128, a stepping-on-side third block 130, and a kickout-side third block 132. On both sides of the circumferential wide major groove 114 in the tire axis direction, the first blocks 126 are zoned by the circumferential wide major groove 114, the first narrow circumferential minor groove 116, and the first transverse groove 120. The second block 128 is zoned at the outside of the first block 126 in the tire axis direction by the first narrow circumferential minor groove 116, the second narrow circumferential minor groove 118, the first transverse groove 120, and the second transverse groove 122. The stepping-on-side third block 130 and the kickout-side third block 132 are located at the outside of the second block 128 in the tire axis direction while zoned by the second narrow circumferential minor groove 118, the first transverse groove 120, and the second transverse groove 122.

The first transverse groove 120 has a bottom raising portion 140 at the side of the circumferential wide major groove 114.

As shown in FIGS. 3 and 5, the bottom raising portion 140 of the second embodiment is formed from an end portion of the first transverse groove 120 that is provided at the side of the circumferential wide major groove 114 to the outside in the tire axis direction. Accordingly, the groove wall of the circumferential wide major groove 114 is linearly extended along the tire circumferential direction, and there is no irregularity in the groove wall.

In the bottom raising portion 140, the end portion at the side of the circumferential wide major groove 14 is highest and the height is gradually decreased toward the outside in the tire axis direction. As shown in FIG. 5, the sectional shape in a longitudinal direction (the tire width direction) exhibits a substantial triangle.

As shown in FIG. 3, in the second embodiment, a top portion 140A of the bottom raising portion 140 is linearly arranged at an extended line of a wheel tread opening edge portion of the circumferential wide major groove 114.

As shown in FIG. 3, in the second embodiment, a base 140B of the bottom raising portion 140 is linearly formed in the tire circumferential direction (parallel to top portion 140A).

As shown in FIG. 3, in the bottom raising portion 140, it is preferable that a size in tire axis direction L0 be in the range of 60 to 200% of a groove width size W0 of the circumferential wide major groove 114. In the second embodiment, the size in tire axis direction L0 is set at 123% of the groove width size W0.

Figure 5A:
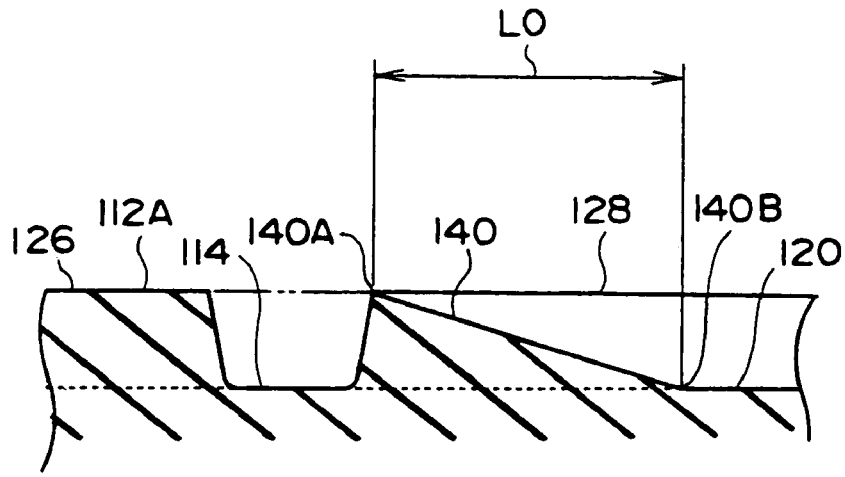
FIG. 5A is a sectional view taken on line 5-5 of a bottom raising portion shown in FIG. 3.
Figure 5B:
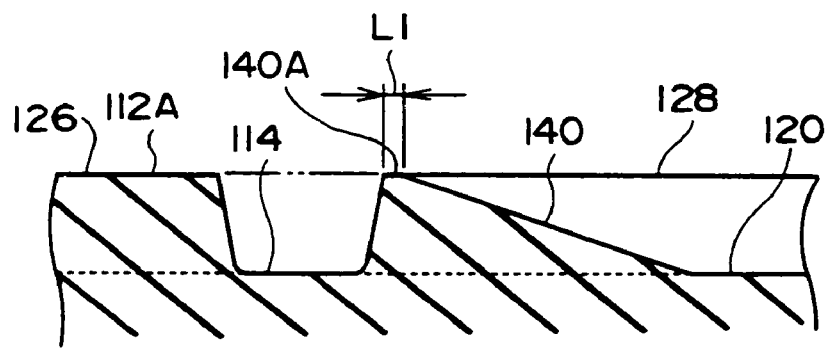
FIG. 5B is a sectional view showing a bottom raising portion according to another embodiment.
Figure 6:
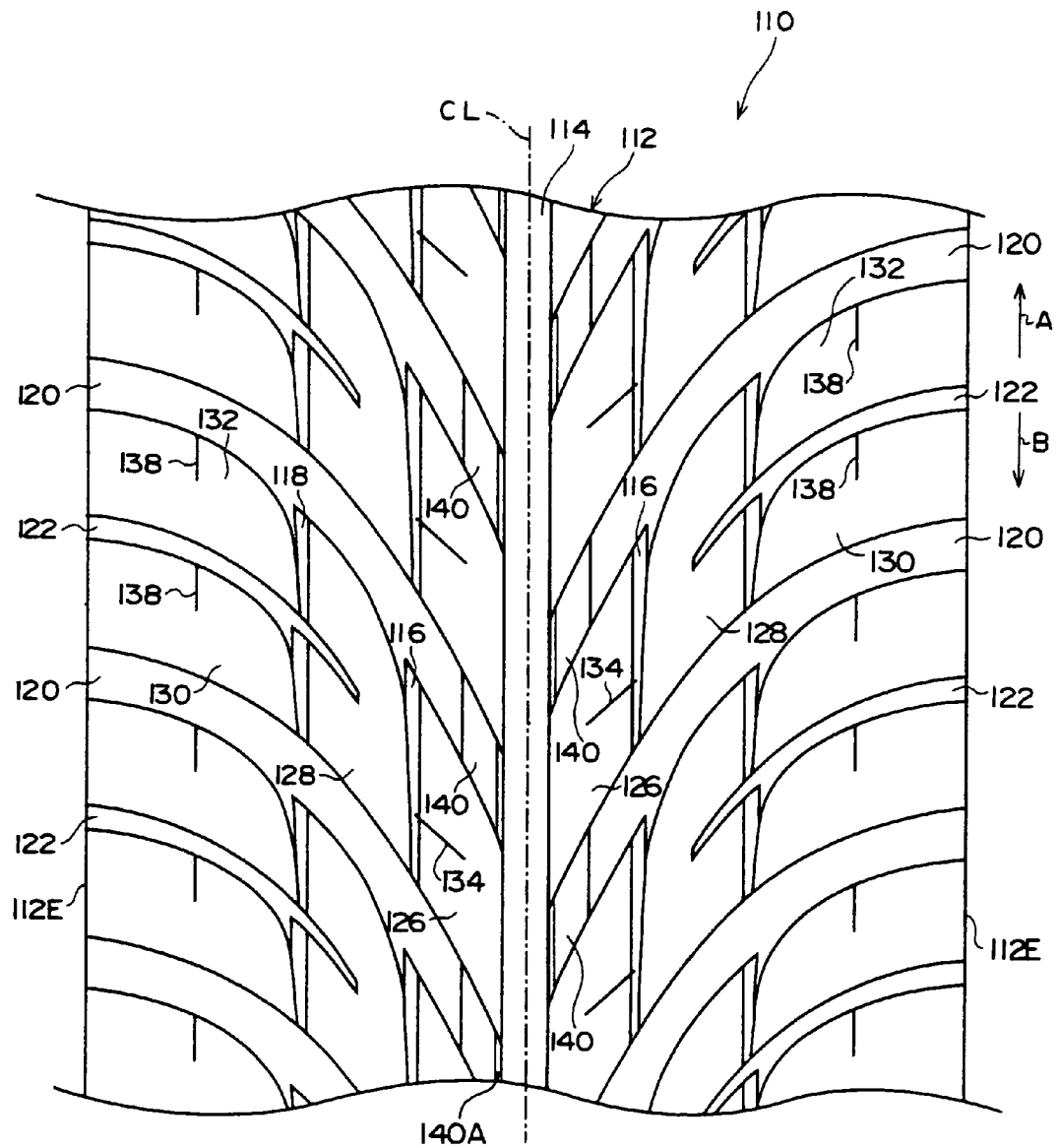
FIG. 6 is a plan view showing a tread of a pneumatic tire according to another embodiment.

As shown in FIG. 5A, in the bottom raising portion 140 of the second embodiment, the top portion 140A becomes a vertex of the triangle, and the top portion 140A has no width when viewed from a cross section in the longitudinal direction (the tire width direction). Alternatively, as shown in FIGS. 5B and 6, the top portion 140A may have a width L1.

However, the width L1 of the top portion 140A is set to 3 mm or less when the position of the top portion 140A is flush with the wheel tread 112A of the tread 112.

Figure 5C:
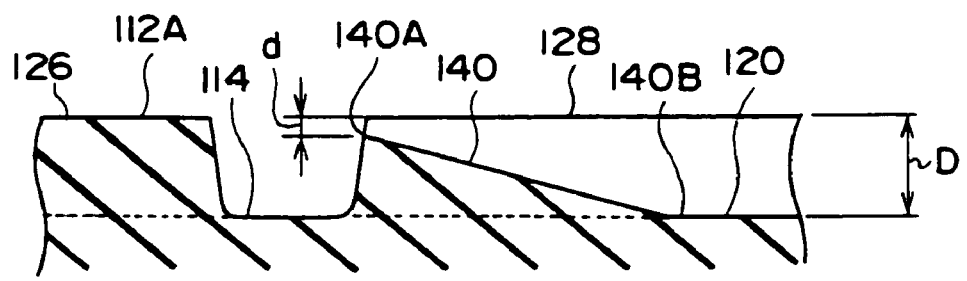
FIG. 5C is a sectional view showing a bottom raising portion according to still another embodiment.

As shown in FIG. 5C, a depth d at the top portion 140A is set to 10% or more of a groove depth D (portion except for bottom raising portion 140, i.e., the deepest portion).

As shown in FIG. 3, a tire equatorial plane-side end portion of the second transverse groove 122 is terminated in the central portion of the second block 128 in the tire axis direction.

Preferably the groove width W3 of the second transverse groove 122 is set in the range of 10 to 80% of the groove width W2 of the first transverse groove 120. The groove width W3 of the second transverse groove 122 of the second embodiment is set in the range of 14 to 50% of the groove width W2 of the first transverse groove 120.

A transverse siping 134 is formed in the central portion of the first block 126 in the circumferential direction. The transverse siping 134 is extended from the first narrow circumferential minor groove 116 toward the block central, and the transverse siping 134 is terminated in the block central portion.

Longitudinal sipings 138 are formed in the central portion of the stepping-on-side third block 130 in the tire axis direction and the central portion of the kickout-side third block 132 in the tire axis direction respectively. The longitudinal siping 138 is extended from kickout edge toward the stepping-on side, and the longitudinal sipings 138 is terminated in the block central portion.

(Function)

In the pneumatic tire 110 of the second embodiment, when the vehicle runs on the wet road surface, the water near the central portion in the tire axis direction flows into the circumferential wide major groove 114, and other water flows into the first transverse groove 120.

The water on the wheel tread of the block surrounded by the circumferential wide major groove 114 and the first transverse groove 120 flows into the circumferential wide major groove 114, the first narrow circumferential minor groove 116, and the second transverse groove 122.

The tread pattern of the pneumatic tire 110 is formed in a directional pattern. Therefore, when the vehicle runs on the wet road surface, the water between the pneumatic tire 110 and the road surface flows efficiently into the circumferential wide major groove 114, the first narrow circumferential minor groove 116, the second narrow circumferential minor groove 118, the first transverse groove 120, and the second transverse groove 122, and the high wet performance is obtained while the increase in negative ratio is suppressed.

Because the high wet performance is obtained while the increase in negative ratio is suppressed, the wheel tread area can be secured in each block to improve the wear-resistant property.

In the area where the block is zoned by the first narrow circumferential minor groove 116 and the second narrow circumferential minor groove 118, the widths and the depths of the first and second narrow circumferential minor grooves 116 and 118 are decreased from the kickout side toward the stepping-on side of the block that are defined during the on-load rotating operation. Therefore, the block rigidity on the stepping-on side is increased to improve the traction performance, brake performance, and cornering performance in the block adjacent to the first narrow circumferential minor groove 116 and the second narrow circumferential minor groove 118.

The groove wall 116A that is provided at the side of the tire equatorial plane CL in the first narrow circumferential minor groove 116 is linearly extended in the tire circumferential direction, and the angle $\theta_{16A}$ with respect to the normal to the wheel tread 112A is set in the range of 50 degrees to 80 degrees. Therefore, a balance can be achieved between the rigidity of the first block 126 at the side of the tire equatorial plane CL with respect to the first narrow circumferential minor groove 116 and the wet drainage property of the first narrow circumferential minor groove 116.

At the block stepping-on side of the first narrow circumferential minor groove 116, the groove wall 116A is coupled to the opposing groove wall 116B that is provided at the outside in the tire axis direction. Therefore, the rigidity can be enhanced to improve the traction performance, brake performance, and cornering performance in the second block 128 that is provided at the outside of the first narrow circumferential minor groove 116 in the tire axis direction.

Similarly, at the block stepping-on side of the second narrow circumferential minor groove 118, the groove wall 118A provided at the side of the tire equatorial plane CL is coupled to the opposing groove wall 118B provided at the outside in the tire axis direction. Therefore, the rigidity can be enhanced in the third block 130 that is provided at the outside of the second narrow circumferential minor groove 118 in the tire axis direction.

The groove width of the second transverse groove 122 is set in the range of 10% to 80% of the groove width of the first transverse groove 120. Therefore, a balance can achieved between the wet drainage property and the block rigidity in the region at the outside in the tire axis direction of the tread 112.

Accordingly the pneumatic tire 110 of the second embodiment is suitable for the use of the racing ultra-high performance vehicle rear-tire.

Test Example

The tire of Conventional example and the tires of the present Examples to which the invention is applied are attached to the rear wheel of the actual vehicle, and the test is performed to confirm the effect of the invention. In the test, the tires of Examples are compared to the tire of Conventional example for the hydroplaning, wet circuit lap time, and wet grip.

Hydroplaning: the vehicle runs on the wet road surface whose water depth is 2 mm, and hydroplaning generation speed is measured. The evaluation is displayed as an index in which the hydroplaning generation speed is set at 100 in the conventional tire. As the index is increased, the hydroplaning generation speed is enhanced. Therefore, the higher index indicates that the tire has the excellent wet drainage property.

Wet circuit lap time: a lap time is measured when the vehicle runs round on the wet road surface (test course) whose water depth is 2 mm. The evaluation is displayed as an index in which the lap time is set at 100 in the conventional tire. As the index is decreased, the lap time is shortened. Therefore, the lower index indicates that the tire has the excellent wet circuit running property.

Wet grip: the feeling evaluation is performed by the test driver when the vehicle runs round on the wet road surface (test course) whose water depth is 2 mm. The evaluation is displayed as an index in which the feeling is set at 100 in the conventional tire. As the index is increased, the tire has the excellent wet grip.

The tire of Example 1: the pneumatic tire shown in FIG. 3 of the second embodiment is used.

The tire of Example 2: the pneumatic tire shown in FIG. 6 of the second embodiment is used. The top portion of the bottom raising portion has the width of 2 mm.

Figure 17:
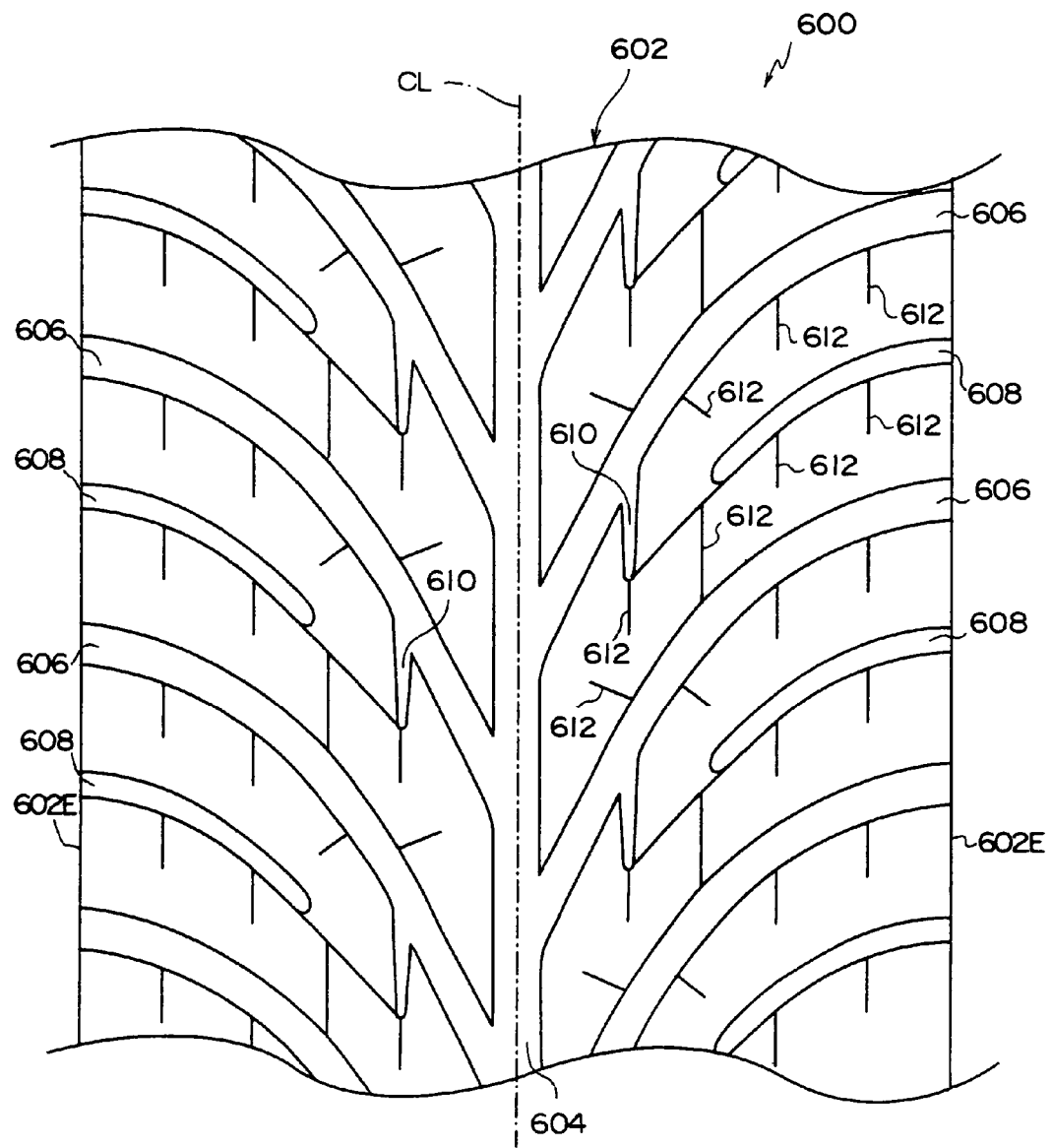
FIG. 17 is a plan view showing a tread of another conventional pneumatic tire.

The tire of Conventional example: a pneumatic tire having a tread pattern shown in FIG. 17 is used.

As shown in FIG. 17, in a tread 602 of a pneumatic tire 600 of Conventional example, a circumferential wide major groove 604 is formed on the tire equatorial plane CL.

In the tread 602, plural first transverse grooves 606 are formed on both sides of the circumferential wide major groove 604. The first transverse groove 606 is extended from a tread end 602E toward the circumferential wide major groove 604, and the first transverse groove 606 is coupled to the circumferential wide major groove 604. A second transverse groove 608 is formed between the first transverse grooves 606. The second transverse groove 608 is extended from the tread end 602E toward the circumferential wide major groove 604, and the second transverse groove 608 is terminated at the middle portion between the tire equatorial plane CL and the tread end 602E.

A minor groove 610 is coupled to the middle portion of the first transverse groove 606. The minor groove 610 is extended toward the stepping-on side and the minor groove 610 is terminated in the block central portion.

The numeral 612 designates siping formed in the land portion.

Sizes are RAR325/55R13 (tread width is 250 mm) in the tires of Conventional example and Examples. Table 3 shows specifications of each tire.

Test vehicle wheel alignment: front-wheel toe angle (toe-out side) of 1 mm and negative camber angle of 4°, rear-wheel toe angle (toe-in side) of 1 mm and negative camber angle of 3° Table 4 shows the test results.

TABLE 3

|  | Conventional example | Example 1 | Example 2 |
|---|---|---|---|
| Circumferential wide major groove Groove depth D0 (mm) | 2.8 | 2.8 | 2.8 |
| Circumferential wide major groove Groove width W0 (mm) | 17 | 17 | 17 |
| First and second narrow circumferential minor grooves Groove depth D1 | — | 1.3 to 2.8 | 1.3 to 2.8 |
| First and second narrow circumferential minor grooves Groove width W1 (mm) of middle portion | — | 4.0 | 4.0 |
| First transverse groove Groove depth D2 (mm) | 2.8 | 2.8 | 2.8 |
| First transverse groove Groove width W2 (mm) | 13 to 15 | 14 to 20 | 14 to 20 |
| Second transverse groove Groove depth D3 (mm) | 2.8 | 2.8 | 2.8 |
| Second transverse groove Groove width W3 (mm) | 6 to 9 | 2 to 10 | 2 to 10 |
| Bottom raising portion With L0 (mm) | — | 16 | 16 |
| Bottom raising portion Top portion width L1 (mm) | — | 0 | 2 |

TABLE 4

| Name | Conventional example | Example 1 | Example 2 |
|---|---|---|---|
| Hydroplaning | 100 | 115 | 113 |
| Wet circuit lap time | 100 | 92 | 90 |
| Wet grip | 100 | 115 | 117 |

As can be seen from the test results, in the pneumatic tires of Examples 1 and 2 to which the invention is applied, all the hydroplaning, wet circuit lap time, and wet grip are improved compared with the pneumatic tire of Conventional example.

Third Embodiment

A third embodiment of a pneumatic tire of the invention will be described in detail with reference to the drawings.

Figure 7:
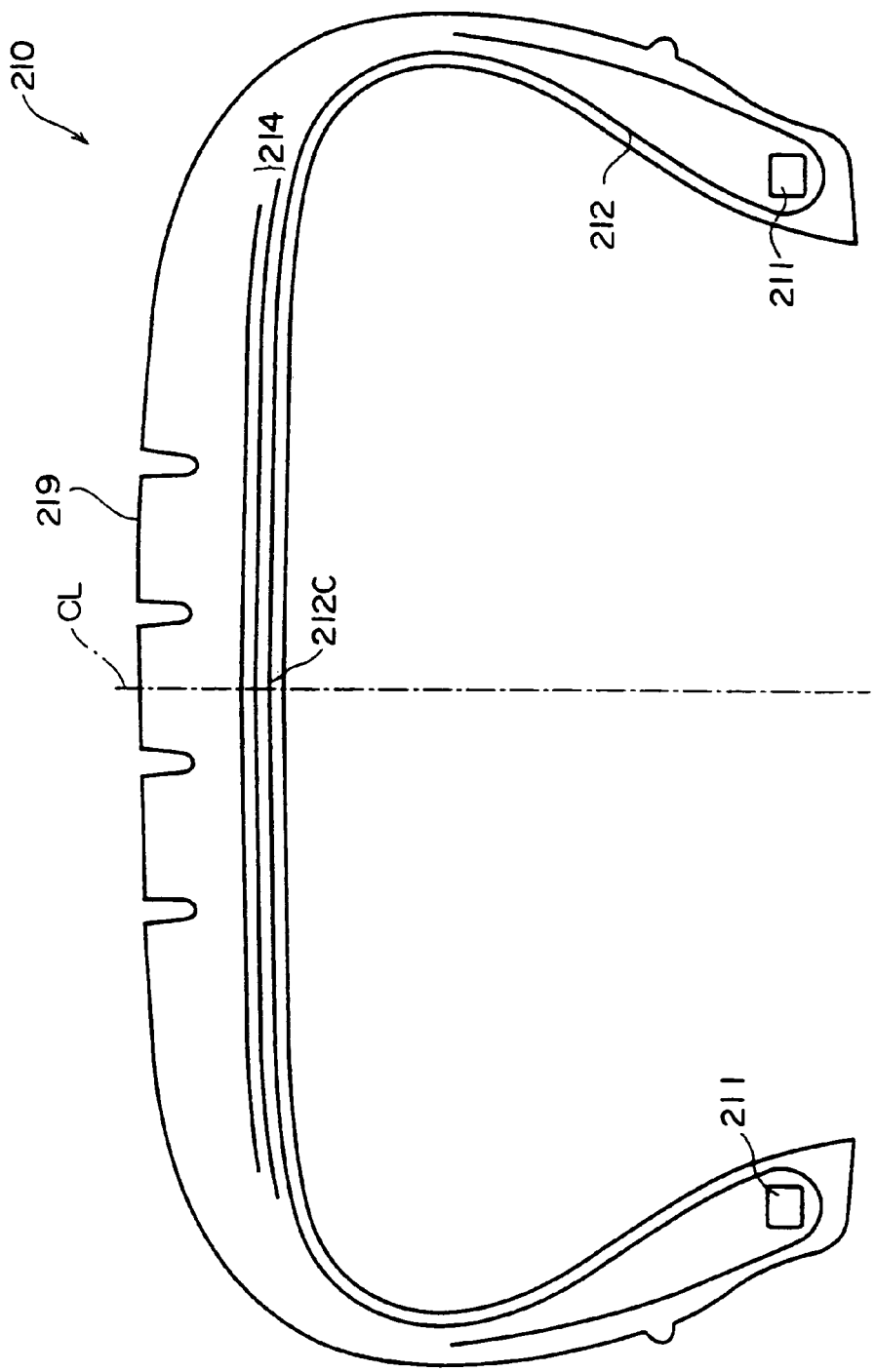
FIG. 7 is a sectional view in a tire axis direction of a pneumatic tire according to a third embodiment.

As shown in FIG. 7, a pneumatic tire 210 according to the third embodiment includes a carcass 212. The carcass 212 includes cords which are substantially extended in the radial direction, and both end portions are folded by bead cores 211 respectively. The carcass 212 is formed by a single layer or multilayer.

A belt layer 214 in which plural belt plies are laminated is embedded on the outside in a tire radial direction of a crown portion 12C of the carcass 212. A tread portion 218 in which the grooves are arranged is formed on the outside in the tire radial direction of the belt layer 214.

As shown in FIG. 8A, in a wheel tread portion 219 of the tread portion 218, a first outer major groove 222A extended in the tire circumferential direction is formed on one surface side with respect to the tire equatorial plane CL, and a second outer major groove 222B extended in the tire circumferential direction is formed on the other surface side with respect to the tire equatorial plane CL. Each of the first outer major groove 222A and the second outer major groove 222B is formed at the position which is close to a quarter point Q of a width W of the wheel tread portion 219. The first outer major groove 222A and the second outer major groove 222B zone the wheel tread portion 219 into a central region 220 and side regions 221.

In both the side regions 221, lug grooves 226 are formed at substantially equal intervals in the tire circumferential direction, and the tire equatorial plane-side end portion of the lug groove 226 is substantially opened to and terminated in the first outer major groove 222A or the second outer major groove 222B.

Both the end portions in the tire width direction of each lug groove 226 are extended across the tread end such that the water can be drained to the outside in the tire width direction. As used herein, the term "tread end" shall mean an outermost ground contact portion in the tire width direction, in the case where the pneumatic tire is attached to a standard rim defined by JATMA YEAR BOOK (2004, specification of THE Japan Automobile tire Manufacturers Association), the pneumatic tire is filled with an inner pressure of 100% of a pneumatic pressure (maximum pneumatic pressure) corresponding to a maximum load capacity (bold load in an inner pressure-load capacity corresponding table) in an application size and ply rating in JATMA YEAR BOOK, and the maximum load capacity is applied to the pneumatic tire. When TRA specification or ETRTO specification is applied to a place where the pneumatic tire is used or a place where the pneumatic is manufactured, the test is subject to each specification.

In the central region 220, a first inner major groove 224A extended in the tire circumferential direction is formed on one side surface with respect to the tire equatorial plane CL, and a second inner major groove 224B extended in the tire circumferential direction is formed on the other surface with respect to the tire equatorial plane CL. Each of the first outer major groove 222A, second outer major groove 222B, first inner major groove 224A, and second inner major groove 224B is the major groove having the groove depth $D_0$. The first inner major groove 224A and the second inner major groove 224B are arranged at the positions such that a distance between the first inner major groove 224A and the second inner major groove 224B, a distance between the first outer major groove 222A and the first inner major groove 224A, and a distance between the second outer major groove 222B and the second inner major groove are substantially equalized to one another.

A central land portion row 228, a first adjacent land portion row 230, and a second adjacent land portion row 232 are formed in the central region 220. The central land portion row 228 is zoned by the first inner major groove 224A and the second inner major groove 224B. The first adjacent land portion row 230 is zoned by the first outer major groove 222A and the first inner major groove 224A. The second adjacent land portion row 232 is zoned by the second outer major groove 222B and the second inner major groove 224B.

Plural central inclined grooves (lug grooves) 234 are formed in the central region 220. The central inclined grooves 234 are formed at substantially equal intervals so as to cross the central land portion row 228, and the central inclined grooves 234 are extended while inclined with respect to the tire circumferential direction. As a result, a land portion 229 is formed in the central land portion row 228 by the first inner major groove 224A, second inner major groove 224B, central inclined grooves 234 adjacent to each other in the tire circumferential direction. The land portions 229 are arrayed in the tire circumferential direction so as to stride over both the sides of the tire equatorial plane CL.

Plural first inclined grooves 236 are arranged in the central region 220. The first inclined grooves 236 are formed at substantially equal intervals so as to cross the first adjacent land portion row 230, and the first inclined grooves 236 are extended while inclined with respect to the tire circumferential direction. As a result, a land portion 231 is formed in the first adjacent land portion row 230 by the first inner major groove 224A, first outer major groove 222A, first inclined grooves 236 adjacent to each other in the tire circumferential direction. The land portions 231 are arrayed in the tire circumferential direction. The inclination direction of the first inclined groove 236 is opposite to the inclination direction of the central inclined groove 234.

Similarly, plural second inclined grooves 238 are arranged in the central region 220. The second inclined grooves 238 are formed at substantially equal intervals so as to cross the second adjacent land portion row 232, and the second inclined grooves 238 are extended while inclined with respect to the tire circumferential direction. As a result, a land portion 233 is formed in the second adjacent land portion row 232 by the second inner major groove 224B, second outer major groove 222B, second inclined grooves 238 adjacent to each other in the tire circumferential direction. The land portions 233 are arrayed in the tire circumferential direction. The inclination direction of the second inclined groove 238 is similar to the inclination direction of the first inclined groove 236.

The groove length is set at $L_0$ for each of the central inclined groove 234, first inclined groove 236, and second inclined groove 238. The groove depth is set at $D_1$ (see FIG. 8B) in the groove portion except for the later-mentioned bottom raising portion for each of the central inclined groove 234, first inclined groove 236, and second inclined groove 238.

(First Inclined Groove)

A first bottom raising portion 242 which raises the groove bottom is formed near a first inner major groove-side end 236J in the first inclined groove 236, so that the first inclined groove 236 is substantially opened to and terminated in the first inner major groove 224A (also see FIG. 8B).

A cross section of the first bottom raising portion 242 in the tire width direction (longitudinal direction of the groove) is formed in a chevron shape, the first inner major groove-side end 236J has the highest peak where a first edge line 244 is formed, and a first inclined surface 246 is formed as the groove bottom surface. In the first bottom raising portion 242, the groove depth is gradually increased from the first inner major groove-side end 236J toward a first outer major groove-side end 242K at the bottom raising portion 242 (namely, the groove depth is gradually decreased from the first outer major groove-side end 242K of the first bottom raising portion 242 toward the first inner major groove-side end 236J).

The first inclined groove 236 is completely opened to the first outer major groove 222A at the first outer major groove-side end 236K of the first inclined groove 236.

A groove length $L_1$ of a groove portion 236P in which the first inclined surface 246 is formed as the groove bottom surface is set in the range of 5 to 100% of the groove length $L_0$ of the first inclined groove 236 having the groove portion 236P.

The position of the first edge line 244 in the tire width direction is located at the same position as the groove edge of the first inner major groove 224A.

(Central Inclined Groove)

A central bottom raising portion 252 which raises the groove bottom is formed near a first inner major groove-side end 234J of the central inclined groove 234, so that the central inclined groove 234 is substantially opened to and terminated in the first inner major groove 224A.

As with the first bottom raising portion 242, a cross section in the tire width direction (longitudinal direction of the groove) of the central bottom raising portion 252 is formed in a chevron shape, the first inner major groove-side end 234J has the highest peak where a central edge line 254 is formed, and a central inclined surface 256 is formed as the groove bottom surface. In the central bottom raising portion 252, the groove depth is gradually increased from the first inner major groove-side end 234J toward a second inner major groove-side end 252K at the central bottom raising portion 252 (namely, the groove depth is gradually decreased from the second inner major groove-side end 252K of the central bottom raising portion 252 toward the first inner major groove-side end 234J).

The central inclined groove 234 is completely opened to the second inner major groove 224B at the second inner major groove-side end 234K of the central inclined groove 234.

The groove length of a groove portion 234P in which the central inclined surface 256 is formed as the groove bottom surface is set in the range of 5 to 100% of the groove length of the central inclined groove 234 having the groove portion 234P.

The position of the central edge line 254 in the tire width direction is located at the same position as the groove edge of the first inner major groove 224A.

(Second Inclined Groove)

A second bottom raising portion 262 which raises the groove bottom is formed near a second inner major groove-side end 238J of the second inclined groove 238, so that the second inclined groove 238 is substantially opened to and terminated in the second inner major groove 224B.

As with the central bottom raising portion 252, a cross section in the tire width direction (longitudinal direction of the groove) of the second bottom raising portion 262 is formed in a chevron shape, the second inner major groove-side end 238J has the highest peak where a second edge line 264 is formed, and a second inclined surface 266 is formed as the groove bottom surface. In the second bottom raising portion 262, the groove depth is gradually increased from the second inner major groove-side end 238J toward a second outer major groove-side end 262K at the second bottom raising portion 262 (namely, the groove depth is gradually decreased from the second outer major groove-side end 262K toward the second inner major groove-side end 238J at the second bottom raising portion 262).

The second inclined groove 238 is completely opened to the second outer major groove 222B at the second outer major groove-side end 238K thereof.

The groove length of a groove portion 238P in which the second inclined surface 266 is formed as the groove bottom surface is set in the range of 5 to 100% of the groove length of the second inclined groove 238 having the groove portion 238P.

The position of the second edge line 264 in the tire width direction is located at the same position as the groove edge of the second inner major groove 224B.

(Lug Groove)

The lug grooves 226 have the same basic configuration, action, and effect on both the sides of the tire equatorial plane CL. Therefore, the lug groove 226 indicated on the left of FIG. 8A (one surface side of the tire equatorial plane CL) will be described, and the description will be omitted for the lug groove 226 on the right.

A lug groove bottom raising portion 272 which raises the groove bottom is formed near a first outer major groove-side end 226J of the lug groove 226, so that the lug groove 226 is substantially opened to and terminated in the first outer major groove 222A (also see FIG. 8B).

A cross section of the lug groove bottom raising portion 272 in the tire width direction (longitudinal direction of the groove) is formed in a chevron shape, the first outer major groove-side end 226J has the highest peak where a lug groove edge line 274 is formed, and a lug groove inclined surface 276 is formed as the groove bottom surface. In the lug groove bottom raising portion 272, the groove depth is gradually increased from the first outer major groove-side end 226J toward a tread end-side end 272K at the lug groove bottom raising portion 272 (namely, the groove depth is gradually decreased from the tread end-side end 272K toward the first outer major groove-side end 226J at the lug groove bottom raising portion 272).

The lug groove 226 is completely opened at a tread end T.

The groove length of a groove portion 226P in which the lug groove inclined surface 276 is formed as the groove bottom surface is set in the range of 5 to 100% of the groove length of the lug groove 226 having the groove portion 226P.

The position of the lug groove edge line 274 in the tire width direction is located at the same position as the groove edge of the first outer major groove 222A.

The respective length of the groove portion where the groove bottom is formed is set at $L_1$ (see FIG. 8B) for each of the central inclined surface 256, first inclined surface 246, second inclined surface 266, and the lug groove inclined surface 276.

(Function)

As described above, in the third embodiment, the directional tread pattern is formed in the wheel tread portion 219, and the central bottom raising portion 252, first bottom raising portion 242, second bottom raising portion 262, and lug groove bottom raising portion 272 are formed in the central inclined groove 234, first inclined groove 236, second inclined groove 238, and lug groove 226 respectively.

Therefore, in wet road surface driving, the water near the central bottom raising portion 252 is distributed into the water which flows into the first inner major groove 224A while not guided by the central inclined surface 256 and the water which flows into the second inner major groove 224B while guided by the central inclined surface 256. The water near the first bottom raising portion 242 is distributed into the water which flows into the first inner major groove 224A while not guided by the first inclined surface 246 and the water which flows into the first outer major groove 222A while guided by the first inclined surface 246. The water near the second bottom raising portion 262 is distributed into the water which flows into the second inner major groove 224B while not guided by the second inclined surface 266 and the water which flows into the second outer major groove 222B while guided by the second inclined surface 266. The water near the lug groove bottom raising portion 272 is distributed into the water which flows into the first outer major groove 222A while not guided by the lug groove inclined surface 276 and the water which flows into the tread end T while guided by the lug groove inclined surface 276. Accordingly, the pneumatic tire having the excellent wet drainage property is obtained.

The roadholding ability on the dry road surface, uneven wear-resistant property, and pattern noise property are improved, because the rigidity is enhanced in the corner portion (particularly, the corner portion 231C which has an acute angle when viewed from the side of the wheel tread portion 219) of the adjacent land portion 231 with the provision of the first bottom raising portion 242. The same effect can be obtained in corner portions of land portions adjacent to the central bottom raising portion 252, the second bottom raising portion 262 and lug groove bottom raising portion 272.

Fourth Embodiment

Figure 9A:
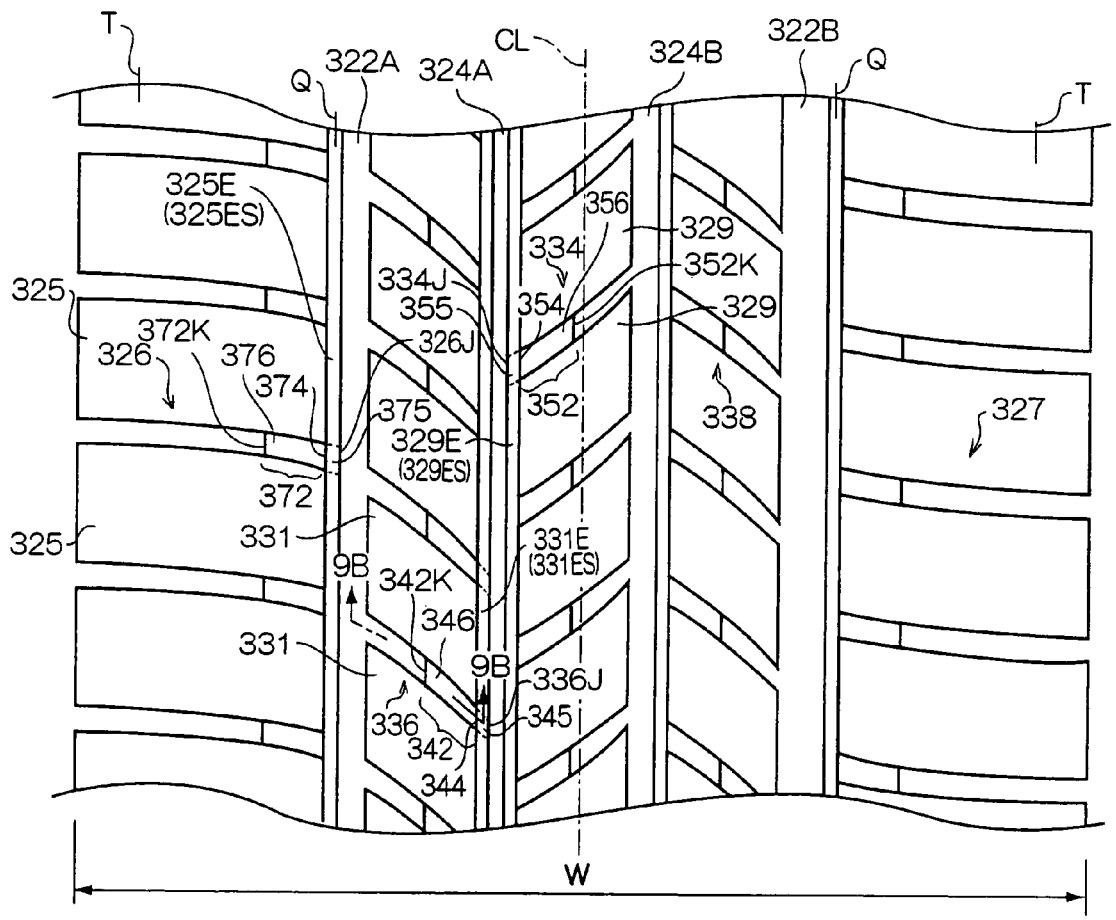
FIG. 9A is a plan view showing a tread of a pneumatic tire according to a fourth embodiment.

Then, a fourth embodiment will be described with reference to FIG. 9A. In a pneumatic tire according to the fourth embodiment, when compared with the third embodiment, a first outer major groove 322A is formed in place of the first outer major groove 222A, a second outer major groove 322B is formed in place of the second outer major groove 222B, a first inner major groove 324A is formed in place of the first inner major groove 224A, and a second inner major groove 324B is formed in place of the second inner major groove 224B. Instead of the lug grooves 226, a lug groove 326 is formed on one surface side of the tire equatorial plane CL, and a lug groove 327 is formed on the other surface side of the tire equatorial plane CL. The basic configuration, function, and effect of a second inclined groove 338 are similar to those of a first inclined groove 336, so that the description of the second inclined groove 338 will be omitted. The basic configuration, action, and effect of the lug groove 327 are similar to those of the lug groove 326, so that the description of the lug groove 327 will be omitted.

The fourth embodiment is similar to the third embodiment in the positions and lengths of a central inclined groove 334, a first inclined groove 336, and the lug groove 326. However, the fourth embodiment differs from the third embodiment in the shape and position of the bottom raising portion formed in each inclined groove.

(First Inclined Groove)

A first bottom raising portion 342 which raises the groove bottom is formed near a first inner major groove-side end 336J of the first inclined groove 336, so that the first inclined groove 336 is substantially opened to and terminated in a first inner major groove 324A.

Figure 9B:
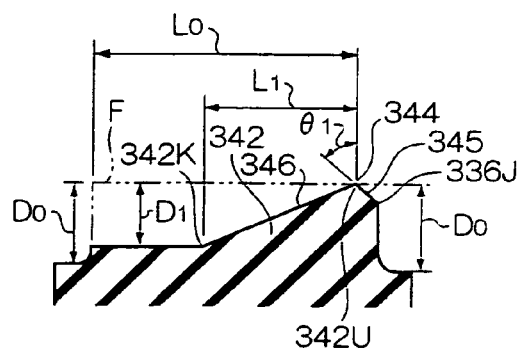
FIG. 9B is a sectional view taken on line 9B-9B of FIG. 9A.

A cross section of the first bottom raising portion 342 in the tire width direction (longitudinal direction of the groove) is formed in a chevron shape, and a first edge line 344 is formed in parallel with the tire circumferential direction at a top portion 342U. A first inner major groove-side first inclined surface 345 and a first outer major groove-side first inclined surface 346 are formed as the groove bottom surface in the first bottom raising portion 342 (see FIG. 9B). In the first inner major groove-side first inclined surface 345, the groove depth is gradually increased from the first edge line 344 toward the first inner major groove 324A. In the first outer major groove-side first inclined surface 346, the groove depth is gradually increased from the first edge line 344 toward a first outer major groove-side end 342K at the first bottom raising portion 342. In the fourth embodiment, the surface height of the first edge line 344 is equalized to the surface height (namely, height of wheel tread F) of a land portion 331 adjacent to the first inclined groove 336. Accordingly, the depth from the wheel tread F to the first edge line 344 becomes 0 mm.

An edge portion 331E of the land portion 331 on the first inner major groove side has an edge surface 331ES that is provided along the first inner major groove 324A and is chamfered in the tapered shape. The first inner major groove-side first inclined surface 345 is inclined at an inclination angle $\theta_1$ with respect to the tire radial direction such that the first inner major groove-side first inclined surface 345 has the same plane as the edge surface 331ES. Accordingly, the position of the first edge line 344 in the tire width direction is set at the same position as an upper edge of the edge surface 331ES. The inclination angle $\theta_1$ is set in the range of 30 to 60°.

(Central Inclined Groove)

A central bottom raising portion 352 which raises the groove bottom is formed near a first inner major groove-side end 334J of the central inclined groove 334, so that the central inclined groove 334 is substantially opened to and terminated in the first inner major groove 324A.

As with the first bottom raising portion 342, a cross section of the central bottom raising portion 352 in the tire width direction (longitudinal direction of the groove) is formed in a chevron shape, and a central edge line 354 is formed in parallel with the tire circumferential direction at a top portion of the central bottom raising portion 352. A first inner major groove-side central inclined surface 355 and a second inner major groove-side central inclined surface 356 are formed in the central bottom raising portion 352. In the first inner major groove-side central inclined surface 355, the groove depth is gradually increased from the central edge line 354 toward the first inner major groove 324A. In the second inner major groove-side central inclined surface 356, the groove depth is gradually increased from the central edge line 354 toward a second inner major groove-side end 352K of the central bottom raising portion 352. In the fourth embodiment, the surface height of the central edge line 354 is equalized to the surface height (namely, height of wheel tread F) of a land portion 329 adjacent to the central inclined groove 334. Accordingly, the depth from the wheel tread F to the central edge line 354 becomes 0 mm.

An edge portion 329E of the land portion 329 on the first inner major groove side has an edge surface 329ES which is provided along the first inner major groove 324A and is chamfered in the tapered shape. In the first inner major groove-side central inclined surface 355, the inclination angle $\theta_1$ is set with respect to the tire radial direction such that the first inner major groove-side central inclined surface 355 has the same plane as the edge surface 329ES. Accordingly, the position of the central edge line 354 in the tire width direction is set at the same position as an upper edge of the edge surface 329ES. The inclination angle $\theta_1$ is set in the range of 30 to 60°.

(Lug Groove)

A lug groove bottom raising portion 372 which raises the groove bottom is formed near a first outer major groove-side end 326J of the lug groove 326, so that the lug groove 326 is substantially opened to and terminated in a first outer major groove 322A.

A cross section of the lug groove bottom raising portion 372 in the tire width direction (longitudinal direction of the groove) is formed in a chevron shape, and a lug groove edge line 374 is formed in parallel with the tire circumferential direction at a top portion of the lug groove bottom raising portion 372. A first outer major groove-side lug groove inclined surface 375 and a tread end-side lug groove inclined surface 376 are formed in the lug groove bottom raising portion 372. In the first outer major groove-side lug groove inclined surface 375, the groove depth is gradually increased from the lug groove edge line 374 toward the first outer major groove 322A. In the tread end-side lug groove inclined surface 376, the groove depth is gradually increased from the lug groove edge line 374 toward a tread end-side end 372K. In the fourth embodiment, the surface height of the lug groove edge line 374 is equalized to the surface height (namely, height of wheel tread F) of a land portion 331 adjacent to the lug groove 326. Accordingly, the depth from the wheel tread F to the lug groove edge line 374 becomes 0 mm.

An edge portion 325E of the land portion 325 on the first outer major groove side has an edge surface 325ES which is provided along the first outer major groove 322A and is chamfered in the tapered shape. In a first outer major groove-side lug groove inclined surface 375, the inclination angle $\theta_1$ is set with respect to the tire radial direction such that the first outer major groove-side lug groove inclined surface 375 has the same plane as the edge surface 325ES. Accordingly, the position of the lug groove edge line 374 in the tire width direction is set at the same position as an upper edge of the edge surface 325ES. The inclination angle $\theta_1$ is set in the range of 30 to 60°.

As described above, in the fourth embodiment, the first inner major groove-side central inclined surface 355 and the edge surface 329ES form the same plane, the first inner major groove-side first inclined surface 345 and the edge surface 331ES also form the same plane, and the first outer major groove-side lug groove inclined surface 375 and the edge surface 325ES also form the same plane. Accordingly, the rigidity is enhanced in each of the edge portions where the edge surfaces are formed, and the roadholding ability is improved on the dry road surface. In the wet road surface driving, the water flows along the respective two surfaces forming the same plane without generating the turbulence, so that the wet drainage property is further improved.

Fifth Embodiment

Figure 10A:
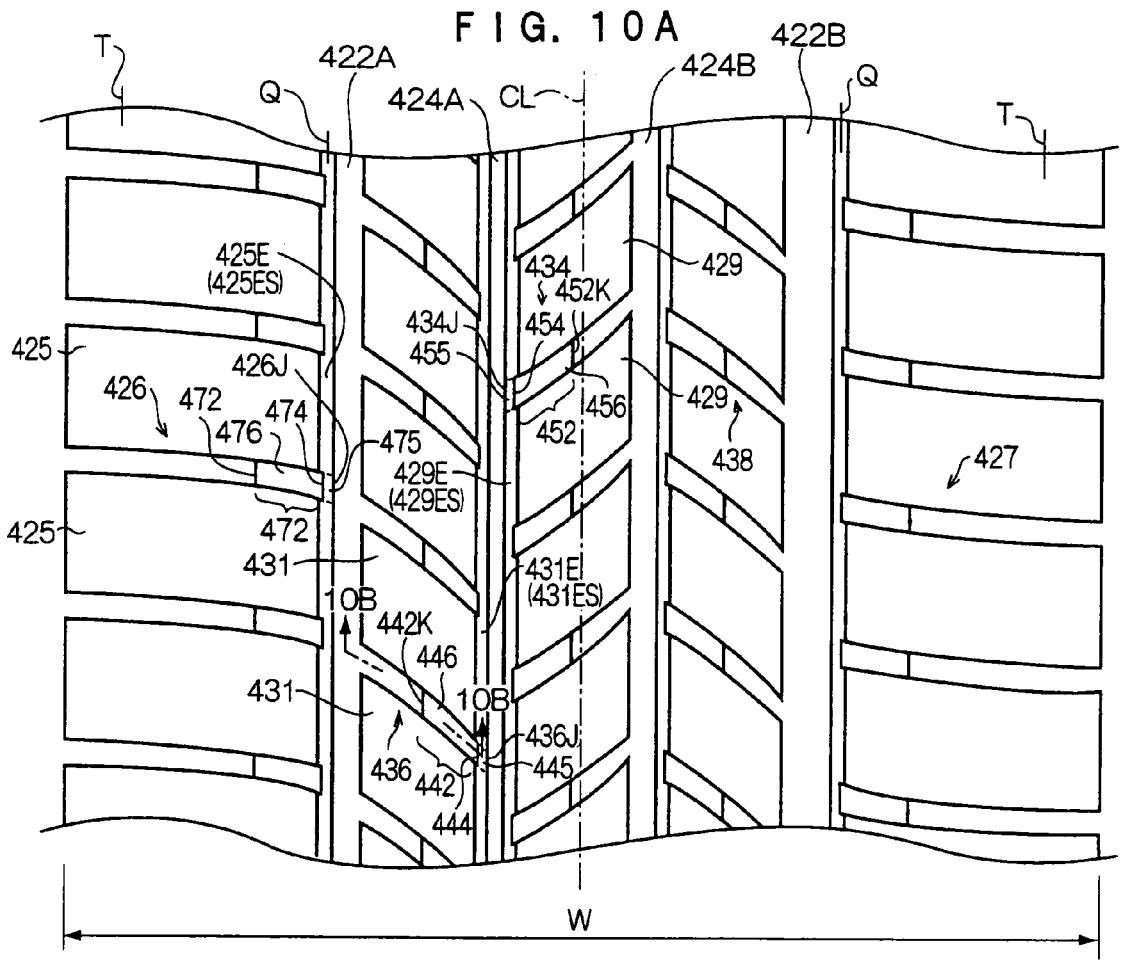
FIG. 10A is a plan view showing a tread of a pneumatic tire according to a fifth embodiment.

Then, a fifth embodiment will be described with reference to FIG. 10A. In a pneumatic tire according to the fifth embodiment, when compared with the fourth embodiment, a first outer major groove 422A is formed in place of the first outer major groove 322A, a second outer major groove 422B is formed in place of the second outer major groove 322B, a first inner major groove 424A is formed in place of the first inner major groove 324A, and a second inner major groove 424B is formed in place of the second inner major groove 324B. A central inclined groove 434 is formed in place of the central inclined groove 334, a first inclined groove 436 is formed in place of the first inclined groove 336, and a second inclined groove 438 is formed in place of the second inclined groove 338. A lug groove 426 is formed in place of the lug groove 326 on one surface side of the tire equatorial plane CL, and a lug groove 427 is formed in place of the lug groove 327 on the other surface side of the tire equatorial plane CL. The basic configuration, function, and effect of the second inclined groove 438 are similar to those of the first inclined groove 436, so that the description of the second inclined groove 438 will be omitted. The basic configuration, function, and effect of the lug groove 427 are similar to those of the lug groove 426, so that the description of the lug groove 427 will be omitted.

The fifth embodiment is similar to the fourth embodiment in the positions and lengths of the central inclined groove 434, first inclined groove 436, and lug groove 426. However, the fifth embodiment differs from the fourth embodiment in the shape and position of the bottom raising portion formed in each inclined groove.

(First Inclined Groove)

A first bottom raising portion 442 which raises the groove bottom is formed near a first inner major groove-side end 436J of the first inclined groove 436, so that the first inclined groove 436 is substantially opened to and terminated in a first inner major groove 424A.

Figure 10B:
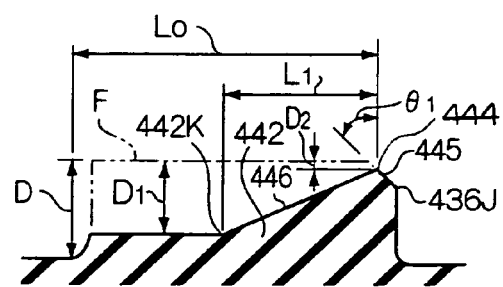
FIG. 10B is a sectional view taken on line 10B-10B of FIG. 10A.

A cross section of the first bottom raising portion 442 is formed in a chevron shape in the tire width direction (longitudinal direction of the groove), and a first edge line 444 is formed in parallel with the tire circumferential direction at a top portion of the first bottom raising portion 442. A first inner major groove-side first inclined surface 445 and a first outer major groove-side first inclined surface 446 are formed in the first bottom raising portion 442 (see FIG. 10B). In the first inner major groove-side first inclined surface 445, the groove depth is gradually increased from the first edge line 444 toward the first inner major groove 422A. In the first outer major groove-side first inclined surface 446, the groove depth is gradually increased from the first edge line 444 toward a first outer major groove-side end 442K of the first bottom raising portion 442. In the fifth embodiment, the position of the first edge line 444 is located closer to the center side of the first inner major groove 424A in the tire width direction than the position of an upper edge of an edge surface 431ES of a land portion 431. The depth $D_2$ from the wheel tread F to the first edge line 444 is set such that the first inner major groove-side first inclined surface 445 and the edge surface 429ES form the same plane.

(Central Inclined Groove)

A central bottom raising portion 452 which raises the groove bottom is formed near a first inner major groove-side end 434J of the central inclined groove 434, so that the central inclined groove 434 is substantially opened to and terminated in a first inner major groove 422A.

As with the first bottom raising portion 442, a cross section of the central bottom raising portion 452 is formed in a chevron shape in the tire width direction (longitudinal direction of the groove), and a central edge line 454 is formed in parallel with the tire circumferential direction at a top portion of the first bottom raising portion 442. A first inner major groove-side central inclined surface 455 and a second inner major groove-side central inclined surface 456 are formed in the central bottom raising portion 452. In the first inner major groove-side central inclined surface 455, the groove depth is gradually increased from the central edge line 454 toward the first inner major groove 422A. In the second inner major groove-side central inclined surface 456, the groove depth is gradually increased from the central edge line 454 toward a second inner major groove-side end 452K of the central bottom raising portion 452. In the fifth embodiment, the position of the central edge line 454 in the tire width direction is located closer to the center side of the first inner major groove 424A than the position of an upper edge of an edge surface 429ES of a adjacent land portion 429. The depth $D_2$ from the wheel tread F to the central edge line 454 is set such that the first inner major groove-side central inclined surface 455 and the edge surface 429ES form the same plane.

(Lug Groove)

A lug groove bottom raising portion 472 which raises the groove bottom is formed near a first outer major groove-side end 426J of the lug groove 426, so that the lug groove 426 is substantially opened to and terminated in the first inner major groove 422A.

A cross section of the lug groove bottom raising portion 472 is formed in a chevron shape in the tire width direction (longitudinal direction of the groove), and a lug groove edge line 474 is formed in parallel with the tire circumferential direction at a top portion of the lug groove bottom raising portion 472. A first outer major groove-side lug groove inclined surface 475 and a tread end-side lug groove inclined surface 476 are formed in the lug groove bottom raising portion 472. In the first outer major groove-side lug groove inclined surface 475, the groove depth is gradually increased from the lug groove edge line 474 toward the first outer major groove 422A. In the tread end-side lug groove inclined surface 476, the groove depth is gradually increased from the lug groove edge line 474 toward a tread end-side end 472K. In the fifth embodiment, the position in the tire width direction of the lug groove edge line 474 is located closer to the center side of the first outer major groove 422A than the position of an upper edge of an edge surface 425ES of a land portion 425. The depth $D_2$ from the wheel tread F to the lug groove edge line 474 is set such that the first outer major groove-side lug groove inclined surface 475 and the edge surface 425ES form the same plane.

According to the fifth embodiment, the volume of the lug groove is increased to improve the wet drainage property in the wet road surface driving.

Sixth Embodiment

A pneumatic tire 810 of a sixth embodiment will be described below.

Figure 11A:
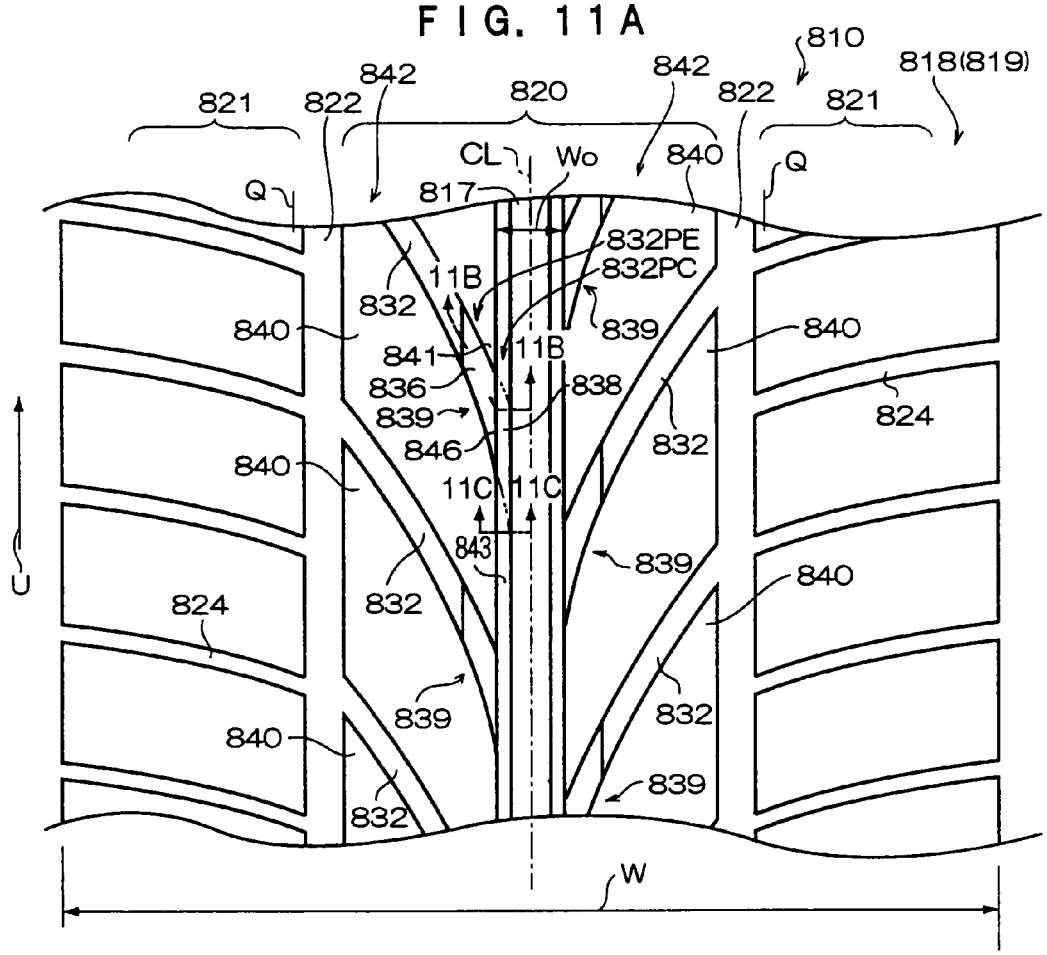
FIG. 11A is a plan view showing a tread of a pneumatic tire according to a sixth embodiment.

As shown in FIG. 11A, in a wheel tread portion 819 of a tread portion 818, a center major groove 817 having the groove depth $D_0$ and the groove width $W_0$ is formed on the tire equatorial plane CL. On both sides of the tire equatorial plane CL, outside major grooves 822 are formed along the tire circumferential direction at the position close to a quarter point Q of a width of a wheel tread portion 819. The outside major grooves 822 zone the wheel tread portion 819 into a central region 820 and side regions 821.

Lug grooves 824 are formed at substantially equal intervals in the tire circumferential direction, and the tire equatorial plane-side end portion of the lug groove 824 is substantially opened to and terminated in the outside major groove 822.

The end portion in the tire width direction of each lug groove 824 is extended across the tread end such that the water can be drained to the outside in the tire width direction.

In the central region 820, plural inclined grooves 832 are arranged on both sides of the tire equatorial plane CL so as to sandwich the tire equatorial plane CL. The inclined groove 832 is opened to the outside major groove 822, and the inclined groove 832 is extended to the center major groove 817 while inclined with respect to the tire circumferential direction. The inclined groove 832 has the groove depth $D_1$, and each inclined groove 832 is substantially opened to and terminated in the center major groove 817.

As a result, a land portion row 842 is formed in the central region 820 by the center major groove 817, the outside major groove 822, and the inclined grooves 832 adjacent to each other in the tire circumferential direction. The land portion rows 842 includes a pair of land portions 840 that are provided in parallel each other with respect to the tire equatorial plane CL.

During the on-load tire rotating operation, when the pneumatic tire 810 is rotated to move the ground contact surface toward a U direction, the inclined grooves 832 separated by the tire equatorial plane are inclined toward the opposite directions with respect to tire circumferential direction such that the groove edge of the inclined groove 832 is sequentially in contact with the road surface from the center major groove 817 side of the inclined groove 832 toward the outside major groove 822 side. Thus, the inclined grooves 832 are formed such that the directional pattern is formed, and thereby the drainage property can be secured with the inclined grooves 832 corresponding to a stream line.

Figure 11B:
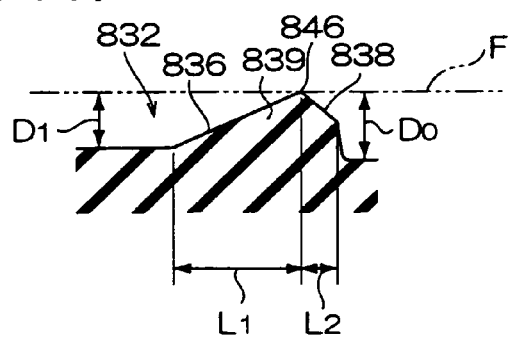
FIG. 11B is a sectional view taken on line 11B-11B of FIG. 11A.

A bottom raising portion 839 which raises the groove bottom is formed near the terminal of the inclined groove 832. The bottom raising portion 839 whose cross section is formed in the chevron shape includes an outside inclined surface 836 and an inside inclined surface 838 (see FIG. 11B). The outside inclined surface 836 forms the outside groove bottom of the inclined groove 832 in the tire width direction. The inside inclined surface 838 forms the inside groove bottom in the tire width direction of the inclined groove 832.

Figure 11C:
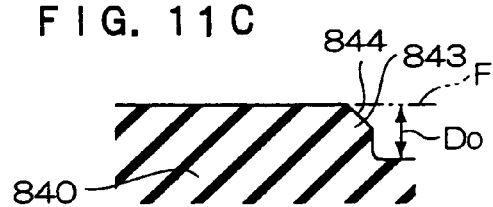
FIG. 11C is a sectional view taken on line 11C-11C of FIG. 11A.

An edge portion 843 of the land portion 840 on the side of the center major groove 817 is formed along the center major groove 817 and is chamfered in the tapered shape so as to have an inclined surface 844 which forms the same surface as the inside inclined surface 838 (see FIG. 11C).

A groove length $L_1$ of a groove portion 832PE in which the outside inclined surface 836 is formed as the groove bottom (in other words, the groove length $L_1$ of the groove portion 832PE in which the groove depth is gradually increased from the later-mentioned edge line 846) ranges from 5 to 40% of a tire ground contact width W. A groove length $L_2$ of a groove portion 832PC in which the inside inclined surface 838 is formed as the groove bottom ranges from 8 to 45% of a width $W_0$ of the center major groove 817.

The edge portion 843 is substantially parallel to the tire circumferential direction. An edge line 846 formed by the outside inclined surface 836 and the inside inclined surface 838 is substantially parallel to the tire circumferential direction. The edge line 846 forms a top portion of the bottom raising portion 839.

The edge line 846 is formed in parallel with the wheel tread portion 819. The surface height of the edge line 846 is set to the same surface height of the land portion 840 (namely, the height of the wheel tread), so that the depth of the edge line 846 from the wheel tread becomes 0 mm.

As described above, in the sixth embodiment, the tread wheel pattern is formed in the wheel tread portion 819, and the bottom raising portion 839 having the chevron shape in cross section is formed in the inclined groove 832. Therefore, in the wet road surface driving, the water near the central portion in the tire width direction of the wheel tread portion 819 is distributed into the water flowing into the center major groove 817 by the inside inclined surface 838 and the water flowing in the inclined groove 832 toward the outside in the tire width direction by the outside inclined surface 836. Therefore, the pneumatic tire of the sixth embodiment has the excellent wet drainage property.

The roadholding ability on the dry road surface and the uneven wear-resistant property are improved, because the rigidity is enhanced in the corner portion (particularly, the corner portion 841 of the adjacent land portion 840 which has an acute angle when viewed from the side of the wheel tread F) by the bottom raising portion 839.

The edge portion 843 of the land portion 840 on the side of the center major groove 817 is provided along the center major groove 817 and is chamfered in the tapered shape so as to have the same surface as the inside inclined surface 838. Accordingly, the rigidity of the edge portion 843 is enhanced to improve the roadholding ability on the dry road surface. In the wet road surface driving, the water flows along the surfaces of the edge portion 843 and inside inclined surface 838 without generating the turbulence, so that the wet drainage property is further improved.

The edge portion 843 is substantially parallel to the tire circumferential direction, and the edge line 846 formed by the outside inclined surface 836 and the inside inclined surface 838 is substantially parallel to the tire circumferential direction. Therefore, the water near the central portion in the tire width direction of the wheel tread portion 819 is further easily distributed into the water flowing into the center major groove 817 by the inside inclined surface 838 and the water flowing in the inclined groove 832 toward the outside in the tire width direction by the outside inclined surface 836. Accordingly, the pneumatic tire of the sixth embodiment has the excellent wet drainage property.

Seventh Embodiment

Figure 12A:
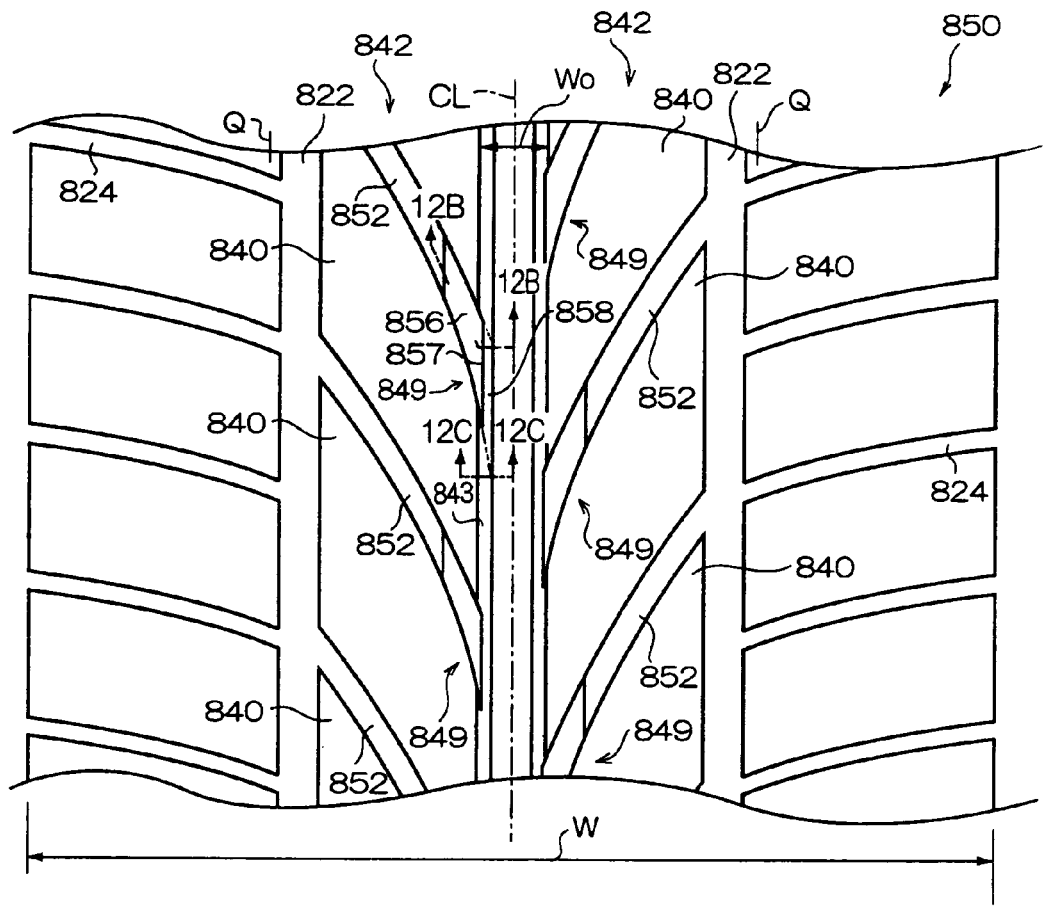
FIG. 12A is a plan view showing a tread of a pneumatic tire according to a seventh embodiment.

A seventh embodiment will be described below. As shown in FIG. 12A, the pneumatic tire of the seventh embodiment differs from that of the sixth embodiment in the shape and position of a bottom raising portion 849 formed in an inclined groove 852 of a wheel tread portion 850.

Figure 12B:
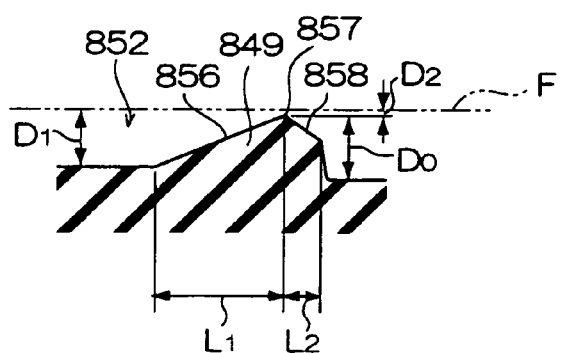
FIG. 12B is a sectional view taken on line 12B-12B of FIG. 12A.
Figure 12C:
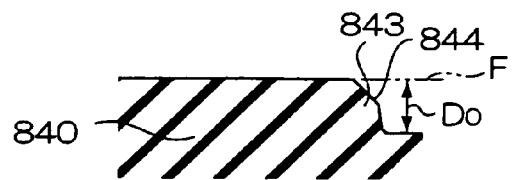
FIG. 12C is a sectional view taken on line 12C-12C of FIG. 12A.

The bottom raising portion 849 which raises the groove bottom is formed near the terminal of the inclined groove 852. The bottom raising portion 849 whose cross section in the tire width direction is formed in the chevron shape includes an outside inclined surface 856 and an inside inclined surface 858 (see FIG. 12B). The outside inclined surface 856 forms the outside groove bottom of the inclined groove 852 in the tire width direction. An inside inclined surface 858 forms the inside groove bottom of the inclined groove 852 in the tire width direction.

The position of an edge line 857 formed by the outside inclined surface 856 and the inside inclined surface 858 in the tire width direction is located closer to the position near the tire equatorial plane CL when compared with the sixth embodiment. The edge line 857 is formed in parallel to the wheel tread portion 850, and the surface height of the edge line 857 is set deeper than the surface height of the land portion 840 (namely, height of wheel tread F) by $D_2$. The inside inclined surface 858 and the inclined surface 844 at the edge portion 843 of the land portion 840 form the same surface.

According to the seventh embodiment, in addition to the effect of the sixth embodiment, the groove volume is increased in the region of the bottom raising portion 849 where the inclined groove has the chevron shape in cross section. Therefore, the wet drainage property is excellent in the wet road surface driving.

Eighth Embodiment

Figure 13A:
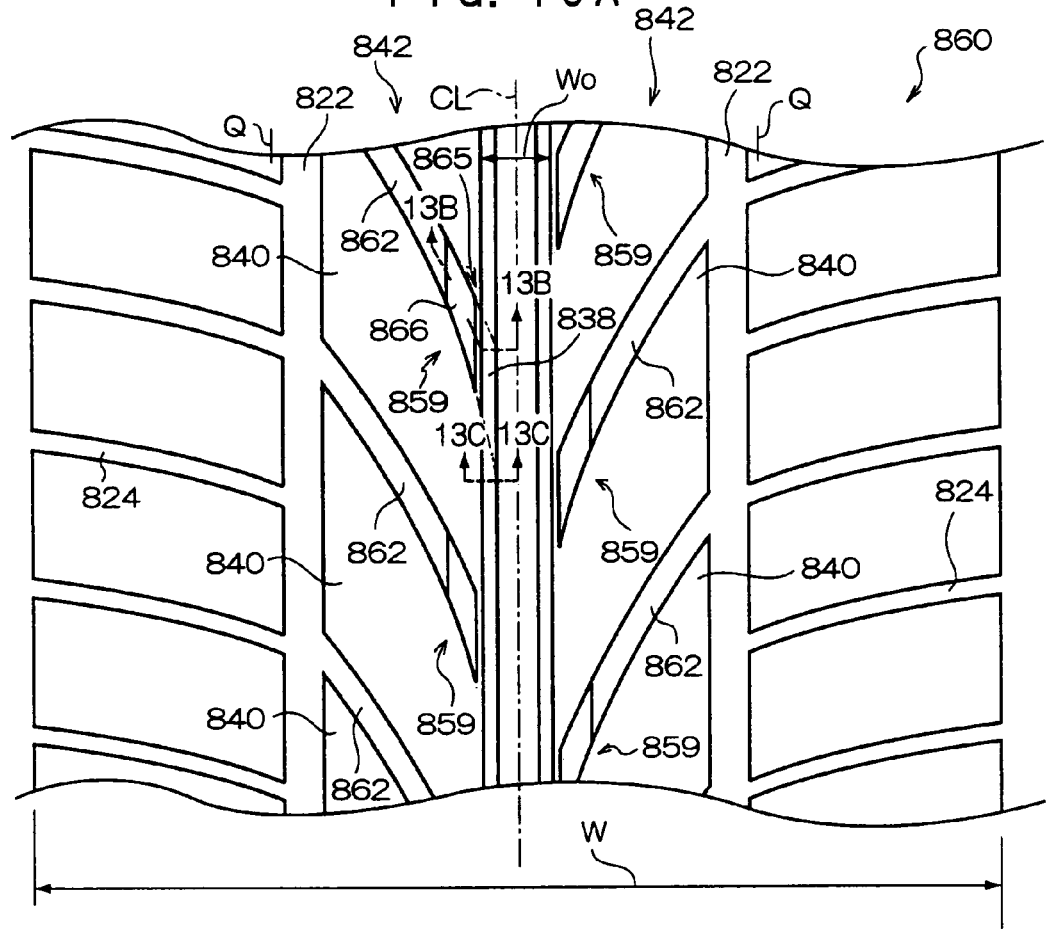
FIG. 13A is a plan view showing a tread of a pneumatic tire according to an eighth embodiment.

An eighth embodiment will be described below. As shown in FIG. 13A, a pneumatic tire of the eighth embodiment differs from that of the sixth embodiment in the shape and position of a bottom raising portion 859 formed in an inclined groove 862 of a wheel tread portion 860.

Figure 13B:
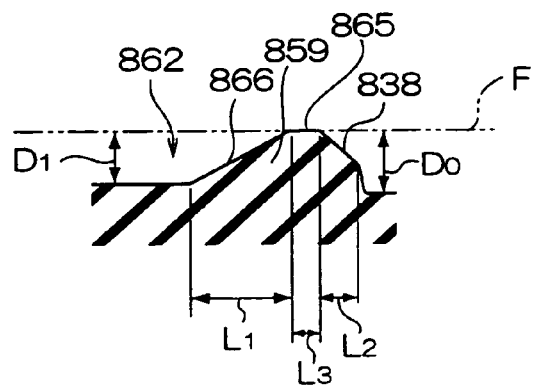
FIG. 13B is a sectional view taken on line 13B-13B of FIG. 13A.
Figure 13C:
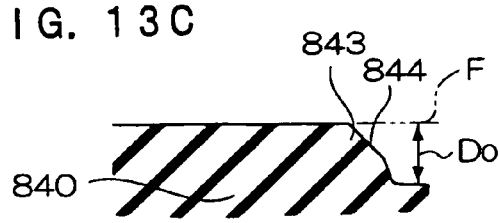
FIG. 13C is a sectional view taken on line 13C-13C of FIG. 13A.

The bottom raising portion 859 which raises the groove bottom is formed near the terminal of the inclined groove 862. The bottom raising portion 859 whose cross section in the tire width direction is formed in the chevron shape includes an outside inclined surface 866, a top-portion plane 865, and the inside inclined surface 838 (see FIG. 13B). The outside inclined surface 866 forms the outside groove bottom of the inclined groove 862 in the tire width direction. The top-portion plane 865 is continued to the tire equatorial plane side of the outside inclined surface 866, and the height of the top-portion plane 865 is similar to that of the land portion 840. The inside inclined surface 838 described in the sixth embodiment is continued to tire equatorial plane side of the top-portion plane 865.

A width $L_3$ of the top-portion plane 865 in the tire width direction is not more than 3 mm.

According to the eighth embodiment, in addition to the effect of the sixth embodiment, the rigidity is enhanced in the corner portion of the land portion 840 adjacent to the bottom raising portion 859. Therefore, the roadholding ability on the dry road surface and the uneven wear-resistant property are improved.

Ninth Embodiment

A pneumatic tire 910 of a ninth embodiment will be described below.

Figure 14A:
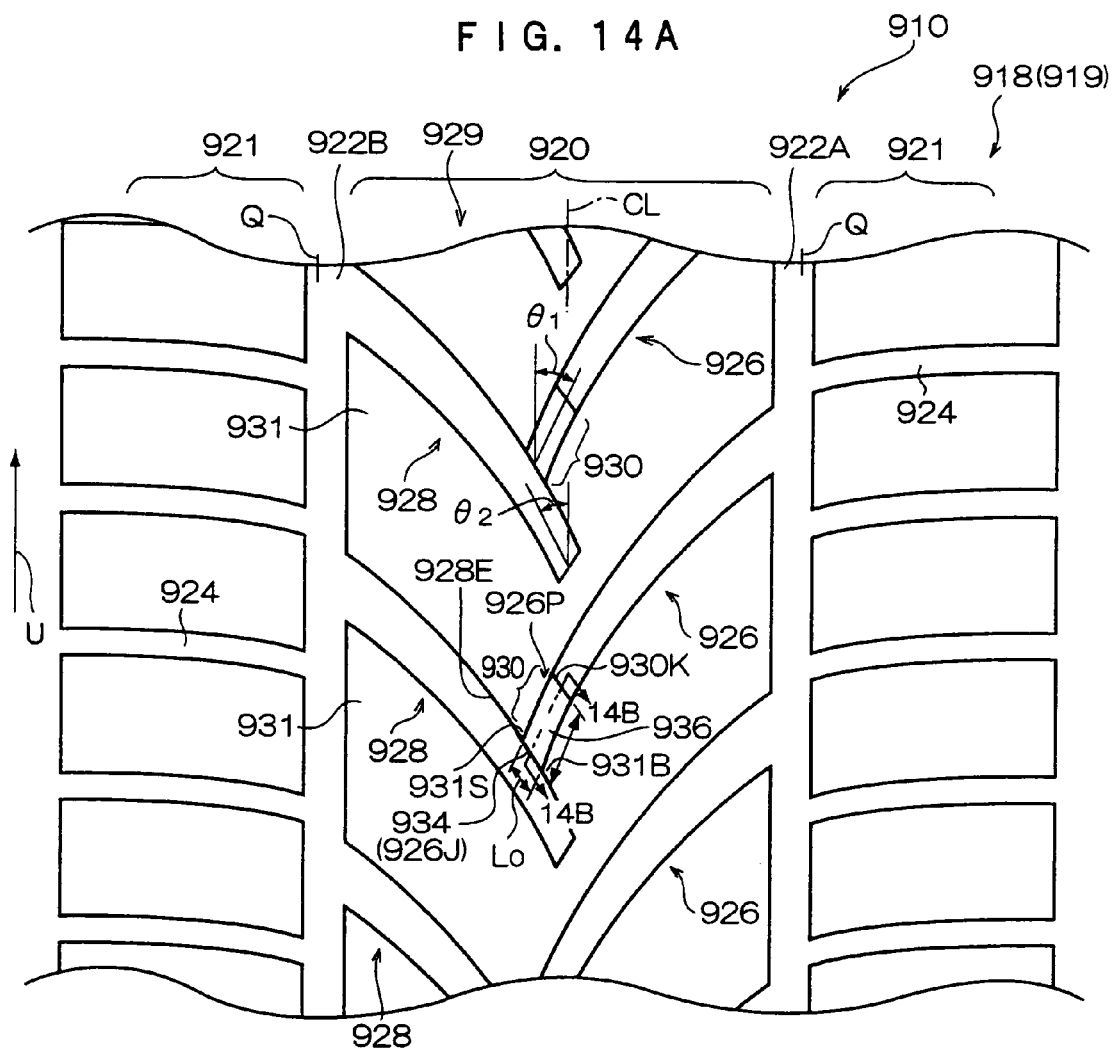
FIG. 14A is a plan view showing a tread of a pneumatic tire according to a ninth embodiment.

As shown in FIG. 14A, in a wheel tread portion 919 of a tread portion 918, circumferential major grooves 922A and 922B are formed along the tire circumferential direction both sides of the tire equatorial plane CL, and the circumferential major grooves 922A and 922B are formed at the position close to a quarter point Q of a width of a wheel tread portion 919. The circumferential major grooves 922A and 922B zone the wheel tread portion 919 into a central region 920 and side regions 921.

Lug grooves 924 are formed at substantially equal intervals in the tire circumferential direction, and the tire equatorial plane-side end portion of the lug groove 924 is substantially opened to the circumferential major grooves 922A or 922B.

The end portion in the tire width direction of each lug groove 924 are extended across the tread end such that the water can be drained to the outside in the tire width direction.

Figure 14B:
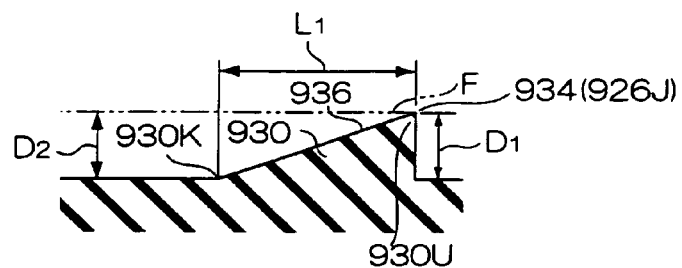
FIG. 14B is a sectional view taken on line 14B-14B of FIG. 14A.

In the central region 920, on the right of the tire equatorial plane CL on FIG. 14A, plural first inclined grooves 926 are formed at substantially equal intervals in the tire circumferential direction. The first inclined groove 926 is completely opened to the circumferential major groove 922A, and the first inclined groove 926 is extended toward the tire center while inclined with respect to the tire circumferential direction. On the left of the tire equatorial plane CL on FIG. 14, plural second inclined grooves 928 are formed at substantially equal intervals in the tire circumferential direction. The second inclined groove 928 is completely opened to the circumferential major groove 922B, and the second inclined groove 928 is extended toward the tire center while inclined with respect to the tire circumferential direction. The first inclined groove 926 is substantially opened to and terminated at the groove wall of the second inclined groove 928. The second inclined groove 928 is terminated while not opened to other inclined grooves.

As a result, a land portion row 929 including land portions 931 is formed in the central region 920. The land portions 931 are formed at substantially equal intervals in the tire circumferential direction, and the land portion 931 is zoned by the circumferential major groove 922, the first inclined groove 926, and the second inclined groove 928.

Thus, in the ninth embodiment, the pairs of inclined grooves including the first inclined groove 926 and the second inclined groove 928 are arrayed at substantially equal intervals in the tire circumferential direction. During the on-load tire rotating operation, when the pneumatic tire 910 is rotated to move the ground contact surface toward the U direction, the first inclined groove 926 and the second inclined groove 928 are inclined toward the opposite directions with respect to tire circumferential direction such that the groove edges of the first inclined groove 926 and second inclined groove 928 are sequentially in contact with the road surface from the tire center toward the side of the circumferential major groove 922. Thus, the first inclined groove 926 and the second inclined groove 928 are formed so as to form the directional pattern, and thereby the drainage property can be secured with the inclined grooves corresponding to the flowing direction.

A bottom raising portion 930 which raises the groove bottom of the first inclined groove 926 is formed in the terminal portion of the first inclined groove 926. As a result, the first inclined groove 926 is substantially opened to and terminated at the groove wall of the second inclined groove 928 (also see FIG. 14B).

A cross section of the bottom raising portion 930 in the tire width direction (longitudinal direction of the groove) is formed in a chevron shape, a first terminal 926J has the highest peak where an edge line 934 is formed, and a first inclined surface 936 is formed as the groove bottom surface. In the bottom raising portion 930, the groove depth is gradually increased from the first terminal 926J toward a circumferential major groove-side end 930K at the bottom raising portion 930 (namely, the groove depth is gradually decreased from the circumferential major groove-side end 930K toward the first terminal 926J at the bottom raising portion 930).

The edge line 934 is formed in a top portion 930U of the bottom raising portion 930 (see FIG. 14B), and the edge line 934 is located on an opened-side groove edge line 928E of the second inclined groove 928.

A groove length $L_1$ of a groove portion 926P in which the first inclined surface 936 is formed as the groove bottom surface is set in the range of 5 to 100% of the groove length of the first inclined groove 926 having the groove portion 926P.

$D_2$ is a groove depth of the first inclined groove 926, and $L_0$ is a length in which the first inclined groove 926 is opened to the second inclined groove 928, i.e., the length of the edge line 934. The second inclined groove 928 has the groove depth of $D_1$. $\theta_1$ is an inclination angle at the terminal portion of the first inclined groove 926 with respect to the tire circumferential direction, and $\theta_2$ is an inclination angle at the terminal portion of the second inclined groove 928 with respect to the tire circumferential direction.

In the ninth embodiment, the surface height of the edge line 934 is equalized to the surface height (namely, height of wheel tread F) of the land portion 931. Accordingly, the depth $D_3$ from the wheel tread F to the edge line 934 becomes 0 mm in the ninth embodiment.

As described above, in the ninth embodiment, the tread wheel pattern is formed in the wheel tread portion 919, the bottom raising portion 930 is formed while having the chevron shape in cross section, and the edge line 934 is located on the opened-side groove edge line 928E. Therefore, in the wet road surface driving, the water near the bottom raising portion 930 of the wheel tread portion 919 is distributed into the water which flows into the circumferential major groove 922A through the first inclined groove 926 while guided by the first inclined surface 936 and the water which flows into the circumferential major groove 22B through the second inclined groove 928. Accordingly, the pneumatic tire having the excellent wet drainage property is obtained in the ninth embodiment.

The rigidity in the tire width direction is increased by the bottom raising portion 930 at a corner portion 931B of the land portion having the large angle formed between the first inclined groove 926 and the second inclined groove 928. And the rigidity in the tire circumferential direction is increased by the bottom raising portion 930 at a corner portion 931S of the land portion having the small angle. Accordingly, the roadholding ability on the dry road surface and the uneven wear-resistant property are improved.

Tenth Embodiment

Figure 15A:
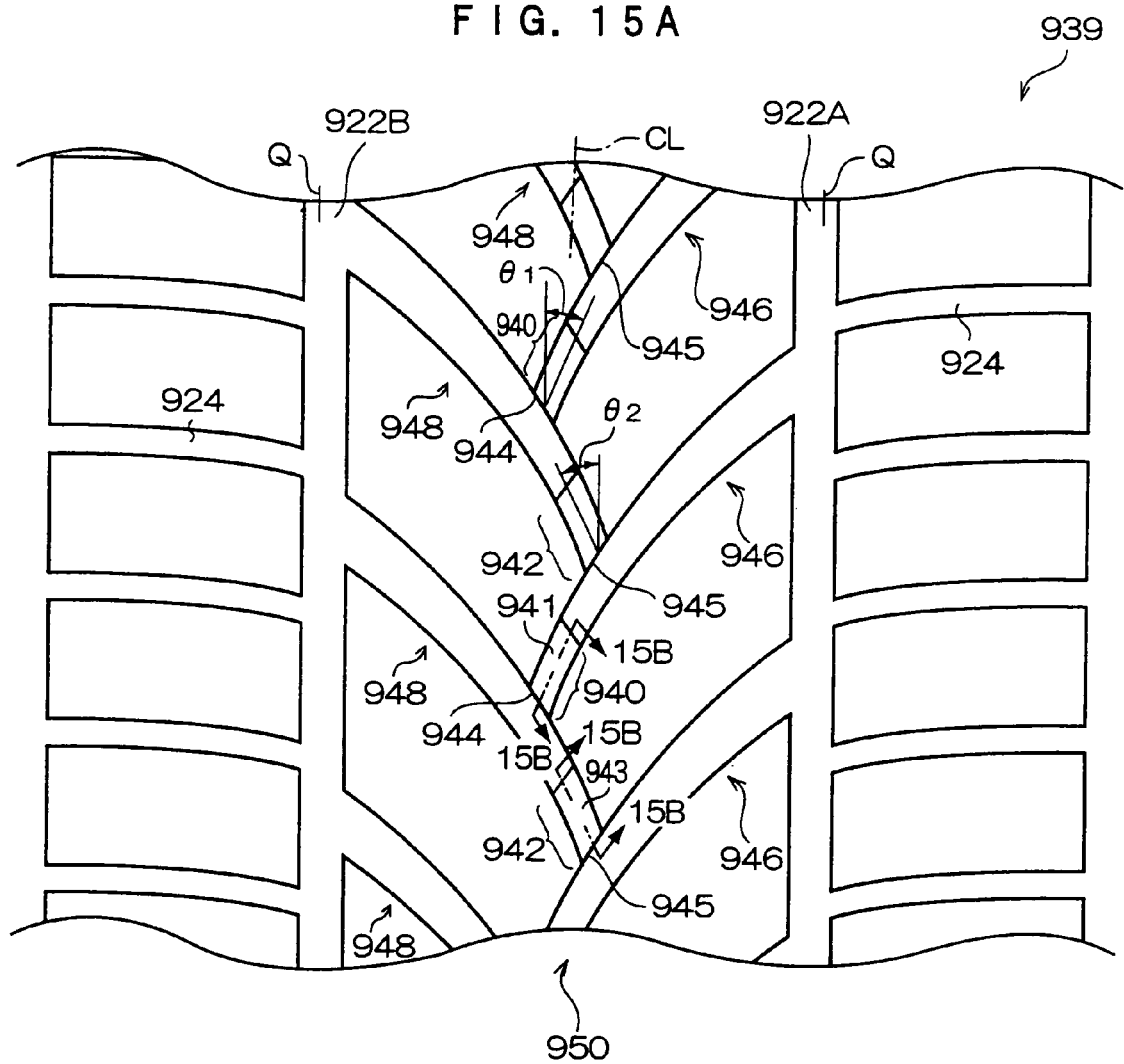
FIG. 15A is a plan view showing a tread of a pneumatic tire according to a tenth embodiment.
Figure 15B:
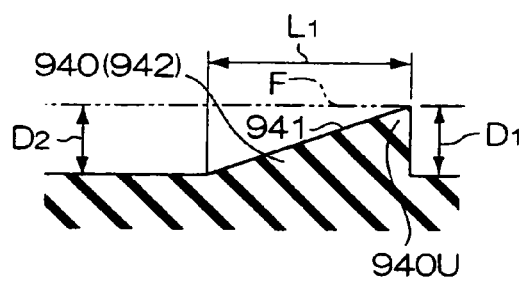
FIG. 15B is a sectional view taken on line 15B-15B of FIG. 15A.

A tenth embodiment will be described below. As shown in FIG. 15, a pneumatic tire of the tenth embodiment differs from that of the ninth embodiment in a tread pattern formed in a central region of a wheel tread portion 939.

On the right of FIG. 15 of the tire equatorial plane CL of the central region, first inclined grooves 946 are formed like the first inclined grooves 926 described in the ninth embodiment. In the first inclined groove 946, a first bottom raising portion 940 is formed like the bottom raising portion 930 described in the ninth embodiment.

On the left of the tire equatorial plane CL at the central region on FIG. 15, second inclined grooves 948 are formed in place of the second inclined groove 928 described in the ninth embodiment. The tenth embodiment differs largely from the ninth embodiment in that a second bottom raising portion 942 whose cross sectional view in the tire width direction is similar to that of the first bottom raising portion 940 is formed in the terminal portion of the second inclined groove 948. The second inclined groove 948 is substantially opened to and terminated at the groove wall of the first inclined groove 946.

As a result, a first edge line 944 formed in a top portion 940U of the first bottom raising portion 940 and the second edge line 945 formed in the top portion of the second bottom raising portion 942 are arranged in a zigzag manner along the tire circumferential direction. In the first bottom raising portion 940, a first inclined surface 941 is formed like the first inclined surface 936 in the ninth embodiment. In the second bottom raising portion 942, a second inclined surface 943 is formed like the first inclined surface 941. In the second inclined surface 943, the groove depth is gradually increased from the second edge line 945 to the side of the circumferential major groove 922B.

A zigzag appearance circumferential minor groove 950 which is substantially continued in the tire circumferential direction is formed in the tenth embodiment. Accordingly, in the wet road surface driving, the water in the region where the zigzag appearance circumferential minor groove 950 is arranged in the wheel tread portion is distributed into both sides of the first edge line 944 and the second edge line 945. Therefore, the wet drainage property is further improved.

Experimental Examples

The inventor performs experiments to compare the pneumatic tire according to the invention and the conventional pneumatic tire in the performance. In the experimental example, the sizes of all the pneumatic tires are PSR 225/45R17 and the tread width (in loading JATMA measurement standard internal pressure) is 180 mm.

The tires are attached to the actually running vehicle, the tire internal pressure is set at 220 kPa, and performance is evaluated by performing the experiments on the loading condition that two persons get on board in front seats. The performance evaluation includes (1) the roadholding ability on the dry road surface, (2) the hydroplaning property, (3) the roadholding ability on the wet road surface, (4) the uneven wear-resistant property, and (5) the pattern noise property.

First, the inventor performs the experiments with the pneumatic tire of Conventional example.

Figure 18A:
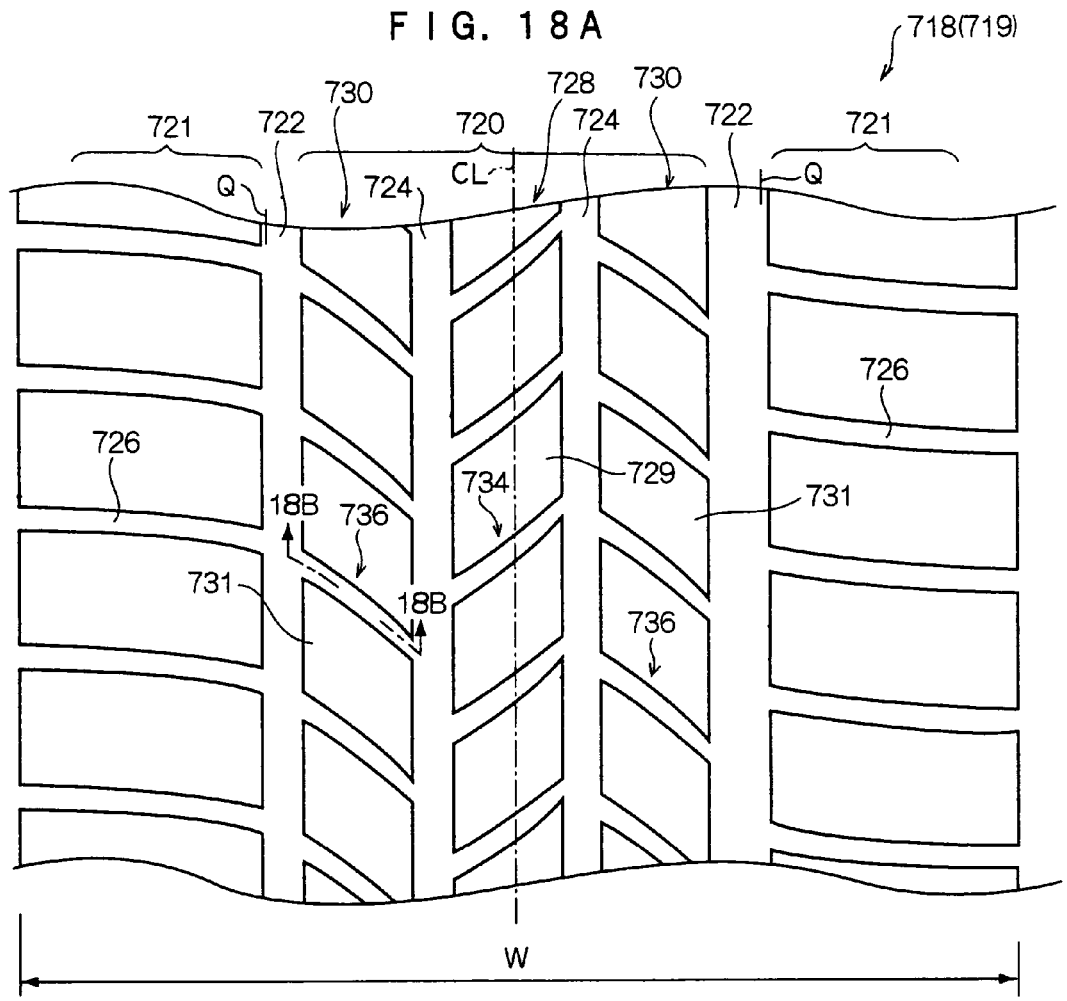
FIG. 18A is a plan view showing a tread of still another conventional pneumatic tire.
Figure 18B:
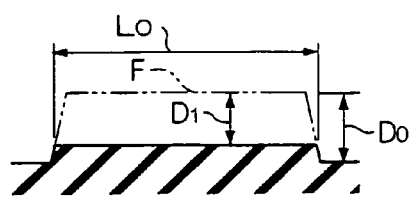
FIG. 18B is a sectional view taken on line 18B-18B of FIG. 18A.

For the pneumatic tire of Conventional example, as shown in FIG. 18A, in a wheel tread portion 719 of a tread portion 718, outer major grooves 722 are formed along the circumferential direction on both sides of a tire equatorial plane, and the outer major grooves 722 are formed at the position of a quarter point Q of the width of the wheel tread portion 719. The outer major grooves 722 zone the wheel tread portion 719 into a central region 720 and side regions 721.

As with the pneumatic tire 210 of the third embodiment, in the sides regions 721, lug grooves 726 are formed at substantially equal intervals in the tire circumferential direction, and the tire equatorial plane-side end portion of the lug groove 726 is opened to the outer major groove 722.

In the central region 720, inner major grooves 724 extended in the tire circumferential direction are formed on both sides of the tire equatorial plane CL respectively. The inner major groove 724 is arranged at the position where the distance between the inner major grooves 724 is substantially equalized to the distance between the outer major groove 722 and the inner major groove 724. The inner major groove 724 and the outer major groove 722 have the groove depth $D_0$.

In the central region 720, inclined grooves 736 are formed at substantially equal intervals in tire circumferential direction on both sides of the tire equatorial plane CL. The inclined groove 736 is opened to the outer major groove 722 and the inner major groove 724, and the inclined groove 736 is extended while inclined with respect to the tire circumferential direction. The inclination direction of the inclined groove 736 is similar to that of the pneumatic tire 210 of the third embodiment. As a result, land portion rows 730 including the land portions 731 are formed. A pair is formed by the two land portions 731 with respect to the tire equatorial plane CL, and the land portion 731 is formed by the outer major groove 722, the inner major groove 724, and the inclined grooves 736 adjacent to each other in the tire circumferential direction.

Central inclined grooves 734 are formed at substantially equal intervals in tire circumferential direction. The central inclined groove 734 is opened to the inner major grooves 724 located on both sides of the tire equatorial plane CL, and the central inclined groove 734 is extended while inclined with respect to the tire circumferential direction. The inclination direction of the central inclined groove 734 is similar to that of the pneumatic tire 210 of the third embodiment. As a result, a central land portion row 728 including the land portion 729 is formed. The land portion 729 crossing the tire equatorial plane CL is formed by the inner major grooves 724, and the central inclined grooves 734 adjacent to each other in the tire circumferential direction.

The inclined groove 736 and the central inclined groove 734 have the groove length $L_0$ and the groove depth $D_1$.

Table 5 shows the tread pattern conditions of the pneumatic tire of Conventional example.

TABLE 5

|  | Pneumatic tire of Conventional example | Pneumatic tire of Example 1 | Pneumatic tire of Example 2 | Pneumatic tire of Example 3 |
|---|---|---|---|---|
| Groove width of major groove D0 (mm) | 8.3 | 8.3 | 8.3 | 8.3 |
| Groove width of inclined groove D1 (mm) | 6.7 | 6.7 | 6.7 | 6.7 |
| Groove length of inclined groove L0 (mm) | 32 | 32 | 32 | 32 |
| Groove length of groove portion L1 (mm) |  | 16 | 7E | 16 |
| Inclination angle θ1 (°) |  |  | 45 | 45 |
| Depth of top portion D2 (mm) |  | 0 | 0 | 1 |

In the experiment in which the conventional pneumatic tire is used, each index of the performance evaluation is defined as follows. (1) For the roadholding ability on the dry road surface, the roadholding ability is defined by feeling during which the vehicle runs in various driving modes on the dry circuit course, and the index is set at 100 for a reference value. (2) For the hydroplaning property, the vehicle runs on the wet road surface whose water depth is 10 mm, and the hydroplaning generation speed is measured. The index is set at 100 for the reference value. (3) For the roadholding ability on the wet road surface, the roadholding ability is defined by feeling during which the vehicle runs in various driving modes on the wet circuit course, and the index is set at 100 for the reference value. (4) For the uneven wear-resistant property, a wear step between the blocks adjacent to each other in the tire circumferential direction and a difference in wear amount between the central region 720 and the side regions (shoulder region) 721 are measured after 5000 km driving on a general road, and the index is set at 100 for the reference value. (5) For the pattern noise property, a noise amount is measured in the vehicle during when the vehicle runs on the smooth road surface at a speed of 60 km/h, and the index is set at 100 for the reference value.

Table 6 shows the indexes.

TABLE 6

|  | Pneumatic tire of Conventional example | Pneumatic tire of Example 1 | Pneumatic tire of Example 2 | Pneumatic tire of Example 3 |
|---|---|---|---|---|
| Roadholding ability on dry road surface | 100 | 105 | 110 | 108 |
| Hydroplaning property | 100 | 105 | 105 | 106 |
| Roadholding ability on wet road surface | 100 | 105 | 108 | 110 |
| Uneven wear-resistant property | 100 | 105 | 110 | 109 |
| Pattern noise property | 100 | 105 | 110 | 108 |

The inventor uses the pneumatic tire 210 according to the third embodiment as the pneumatic tire of Example 1. In the pneumatic tire of Example 1, the tread pattern is formed under the conditions shown in Table 5.

The experiment is performed under the same conditions as the pneumatic tire of Conventional example. (1) For the roadholding ability on the dry road surface, the index which becomes relative evaluation for the pneumatic tire of Conventional example is computed by the feeling of the driver. (2) For the hydroplaning property, the hydroplaning generation limit speed is measured to compute the index which becomes relative evaluation for the pneumatic tire of Conventional example. (3) For the roadholding ability on the wet road surface, the index which becomes relative evaluation for the pneumatic tire of Conventional example is computed by the feeling of the driver. (4) For the uneven wear-resistant property, similarly the wear step and the difference are measured to compute the index which becomes relative evaluation for the pneumatic tire of Conventional example. (5) For the pattern noise property, the noise amount is measured in the vehicle during when the vehicle runs on the smooth road surface at the speed of 60 km/h, and the index which becomes relative evaluation for the pneumatic tire of Conventional example is computed. Table 6 shows the computed indexes.

In Table 6, it is indicated that, as the index is increased, the performance becomes better. That is, when the index is increased, the roadholding ability on the dry road surface or wet road surface becomes better, the hydroplaning generation speed is increased, the wear step or wear amount is decreased, and the pattern noise is decreased.

The inventor also uses the pneumatic tire according to the fourth embodiment as the pneumatic tire of Example 2. In the pneumatic tire of Example 2, the tread pattern is formed under the conditions shown in Table 5.

In the experiment in which the pneumatic tire of Example 2 is used, as with the pneumatic tire of Example 1, the indexes which become the relative evaluation are computed for (1) the roadholding ability on the dry road surface, (2) the hydroplaning property, (3) the roadholding ability on the wet road surface, (4) the uneven wear-resistant property, and (5) the pattern noise property. Table 6 shows the computed indexes.

The inventor uses the pneumatic tire according to the fifth embodiment as the pneumatic tire of Example 3. In the pneumatic tire of Example 3, the tread pattern is formed under the conditions shown in Table 5.

In the experiment in which the pneumatic tire of Example 3 is used, as with the pneumatic tires of Examples 1 and 2, the indexes which become the relative evaluation are computed for (1) the roadholding ability on the dry road surface, (2) the hydroplaning property, (3) the roadholding ability on the wet road surface, (4) the uneven wear-resistant property, and (5) the pattern noise property. Table 6 shows the computed indexes.

As is clear from Table 6, the pneumatic tires of Examples 1 to 3 have the good capabilities for all the performance evaluations (1) to (5) compared with the pneumatic tire of Conventional example.

Thus, the embodiments of the invention are explained only by way of example. However, various changes and modifications could be made without departing from the scope of the invention. Obviously the right range of the invention is not limited to the above embodiments.

In the invention, the circumferential major groove is not limited to one which is linearly extended in the tire circumferential direction. For example, a circumferential major groove which is extended in the tire circumferential direction in a zigzag manner may be used as the circumferential major groove of the invention. However, in the case where the circumferential major groove is formed in the zigzag manner, in order to secure the drainage property, it is preferable to secure a portion through which the water passes linearly in the tire circumferential direction, that is the so-called see-through portion groove (a spatial portion which is continued in the circumferential direction while not obstructed by a projection (projected in the tire width direction) of a side wall in a bent portion of the circumferential major groove formed as the zigzag manner).

INDUSTRIAL APPLICABILITY

As described above, the pneumatic tire according to the invention is suitable to for the attachment to the vehicle in which the high wet performance is required.

EXPLANATION OF THE REFERENCE NUMERALS 10 pneumatic tire
12 tread
12A wheel tread
14 circumferential wide major groove
16 first narrow circumferential minor groove
18 second narrow circumferential minor groove
20 first transverse grooves
22 second transverse groove
24 third transverse groove
26 first block
28 second block
30 stepping-on-side third block
32 kickout-side third block
CL tire equatorial plane
110 pneumatic tire
112 tread
112A wheel tread
114 circumferential wide major groove
116 first narrow circumferential minor grooves
118 second narrow circumferential minor grooves
120 first transverse grooves
122 second transverse grooves
126 first block
128 second block
130 stepping-on-side third block
132 kickout-side third block
210 pneumatic tire
219 wheel tread portion
222A first outer major groove (circumferential major groove)
222B second outer major groove (circumferential major groove)
224A first inner major groove (circumferential major groove)
224B second inner major groove (circumferential major groove)
226 lug grooves (transverse groove)
226J first outer major groove-side end (one end in tire width direction)
226P groove portion
228 central land portion row (land portion row)
229 land portion
230 first adjacent land portion row (land portion row)
231 land portion
232 second adjacent land portion row (land portion row)
233 land portion
234 central inclined grooves (transverse groove)
234J first inner major groove-side end (one end in tire width direction)
234K second inner major groove-side end (other end in the tire width direction)
234P groove portion
236 first inclined groove (transverse groove)
236J first inner major groove-side end (one end in tire width direction)
236K first outer major groove-side end (other end in the tire width direction)
236P groove portion
238 second inclined groove (transverse groove)
238J second inner major groove-side end (one end in tire width direction)
238K second outer major groove-side end (other end in the tire width direction)
238P groove portion
242 first bottom raising portion (bottom raising portion)
246 first inclined surface (inclined surface)
252 central bottom raising portion (bottom raising portion)
256 central inclined surface (inclined surface)
262 second bottom raising portion (bottom raising portion)
266 second inclined surface (inclined surface)
272 lug groove bottom raising portion
322A first outer major groove (circumferential major groove)
322B second outer major groove (circumferential major groove)
324A first inner major groove (circumferential major groove)
324B second inner major groove (circumferential major groove)
325 land portion
325E edge portion
325ES edge surface
326 lug grooves (transverse groove)
326J first outer major groove-side end (one end in tire width direction)
327 lug groove
329 land portion
329E edge portion
329ES edge surface
331 land portion
331E edge portion
331ES edge surface
334 central inclined grooves (transverse groove)
334J first inner major groove-side end (one end in tire width direction)
336 first inclined groove (transverse groove)

336J first inner major groove-side end (one end in tire width direction)
342 first bottom raising portion (bottom raising portion)
342U top portion
345 first inner major groove-side first inclined surface (one-end-side inclined surface)
346 first outer major groove-side first inclined surface (inclined surface)
352 central bottom raising portion (bottom raising portion)
355 first inner major groove-side central inclined surface (one-end-side inclined surface)
356 second inner major groove-side central inclined surface (inclined surface)
372 lug groove bottom raising portion
375 first outer major groove-side lug groove inclined surface
376 tread end-side lug groove inclined surface (inclined surface)
422A first outer major groove (circumferential major groove)
422B second outer major groove (circumferential major groove)
424A first inner major groove (circumferential major groove)
424B second inner major groove (circumferential major groove)
434 central inclined grooves (transverse groove)
436 first inclined groove (transverse groove)
438 second inclined groove (transverse groove)
426 lug grooves (transverse groove)
427 lug groove
436J first inner major groove-side end (one end in tire width direction)
442 first bottom raising portion (bottom raising portion)
445 first inner major groove-side first inclined surface (one end in tire width direction)
446 first outer major groove-side first inclined surface (inclined surface)
434J first inner major groove-side end (one end in tire width direction)
452 central bottom raising portion (bottom raising portion)
455 first inner major groove-side central inclined surface (one end in tire width direction)
456 second inner major groove-side central inclined surface (inclined surface)
426J first outer major groove-side end (one end in tire width direction)
472 lug groove bottom raising portion
475 first outer major groove-side lug groove inclined surface (one end in tire width direction)
476 tread end-side lug groove inclined surface (inclined surface)
T tread end
θ1 inclination angle
810 pneumatic tire
817 center major groove (groove)
819 wheel tread portion
832 inclined grooves
832PE groove portion
832PC groove portion
836 outside inclined surface
838 inside inclined surface
839 bottom raising portion
840 land portion
843 edge portion
846 edge line
849 bottom raising portion
850 wheel tread portion
852 inclined groove
856 outside inclined surface
857 edge line
858 inside inclined surface
859 bottom raising portion
860 wheel tread portion
862 inclined groove
865 top-portion plane
866 outside inclined surface
869 wheel tread portion
877 center major groove (groove)
882 inclined groove
890 land portion
F wheel tread
910 pneumatic tire
919 wheel tread portion
922A, B circumferential major grooves
926 first inclined grooves (inclined groove)
926P groove portion
928 second inclined groove (inclined groove)
928E opened-side groove edge line
930 bottom raising portion
934 edge line
936 first inclined surface (inclined surface)
939 wheel tread portion
940 first bottom raising portion (bottom raising portion)
941 first inclined surface (inclined surface)
942 second bottom raising portion (bottom raising portion)
943 second inclined surface (inclined surface)
944 first edge line (edge line)
945 second edge line (edge line)
946 first inclined groove
948 second inclined grooves
950 zigzag appearance circumferential minor groove
956 first inclined groove (inclined groove)
958 second inclined groove (inclined groove)
969 wheel tread portion
972A, B circumferential major groove
976 first inclined groove (inclined groove)
978 second inclined groove (inclined groove)

What is claimed is:

1. A pneumatic tire comprising at least one circumferential wide major groove, a plurality of transverse grooves, and a narrow circumferential minor groove, wherein, the circumferential wide major groove being provided in a center region in a tire width direction of a tread, the circumferential wide major groove being extended in a tire circumferential direction, each of the transverse grooves being extended from a tread end toward the circumferential wide major groove while inclined with respect to the tire circumferential direction, the narrow circumferential minor groove being arranged on an outside of the circumferential wide major groove in a tire axis direction, the narrow circumferential minor groove being extended in the tire circumferential direction, a groove width of the narrow circumferential minor groove is set narrower than that of the circumferential wide major groove, the tread having a plurality of blocks which are zoned by the circumferential wide major groove, at least one of the transverse grooves, and the narrow circumferential minor groove, the tread having a directional tread pattern in which the each transverse groove being sequentially in contact with a road surface from a tire equatorial plane side toward the tread end of the transverse grooves during an on-load rotating operation, a width and a depth of the narrow circumferential minor groove in an area where the narrow circumferential minor groove zones the block are decreased from a kickout side toward a stepping-on side with respect to the block during the on-load rotating operation, the narrow circumferential minor groove includes a first end connected to one of the plurality of transverse grooves and a second end connected to another of the plurality of transverse grooves and two side groove walls that each extend between the ends, the depth of the narrow circumferential minor groove is increased toward the kickout side from a portion of the narrow circumferential minor groove where the side groove walls of the narrow circumferential minor groove are in contact with one another, and the narrow circumferential minor groove includes a flat bottom which is parallel to the tread and is disposed at a portion of the narrow circumferential groove where the side groove walls of the narrow circumferential groove are not in contact with one another.

2. The pneumatic tire of claim 1, wherein, at least two narrow circumferential minor grooves are provided on the outside of the circumferential wide major groove in the tire axis direction, and the plurality of transverse grooves includes a first transverse groove, a second transverse groove, and a third transverse groove, the first transverse groove being extended from the tread end, the first transverse groove being coupled to the circumferential wide major groove while intersecting with the narrow circumferential minor grooves, the second transverse groove being arranged between the first transverse grooves, the second transverse groove being extended from the tread end and intersecting with the narrow circumferential minor grooves, the second transverse groove being terminated while not coupled to the circumferential wide major groove, the third transverse groove being arranged between the first transverse groove and the second transverse groove, the third transverse groove being extended from the tread end and terminated between the two narrow circumferential minor grooves.

3. The pneumatic tire of claim 2, wherein tire equatorial plane-side terminal positions of the second transverse groove and third transverse groove are located in a central region of a block in the tire axis direction.

4. The pneumatic tire of claim 2, wherein, assuming that W2 is a groove width of the first transverse groove, W3 is a groove width of the second transverse groove, and W4 is a groove width of the third transverse groove, W3 is set in a range of 60% to 110% of W2 and W4 is set in a range of 20% to 60% of W2.

5. The pneumatic tire of claim 2, wherein the narrow circumferential minor groove arranged on the outermost side in the tire axis direction is inclined toward a direction so that the narrow circumferential minor groove is sequentially in contact with the road surface from the tire equatorial plane side toward the tread end side of the narrow circumferential minor groove during the on-load rotating operation.

6. The pneumatic tire of claim 1, wherein:

the at least two narrow circumferential minor grooves are provided on the outside of the circumferential wide major groove in the tire axis direction, the plurality of transverse grooves includes a first transverse groove and a second transverse groove, the first transverse groove being extended from the tread end, the first transverse groove being coupled to the circumferential wide major groove while intersecting with the narrow circumferential minor grooves, the second transverse groove being arranged between the first transverse grooves, the second transverse groove being extended from the tread end, the second transverse groove intersecting with the narrow circumferential minor groove on an outermost side in the tire axis direction while not intersecting with the narrow circumferential minor groove on an innermost side in the tire axis direction, the second transverse groove being terminated while not coupled to the circumferential wide major groove, the first transverse groove has a bottom raising portion at the side of the circumferential wide major groove, and a groove depth of the bottom raising portion is gradually decreased from a start point provided at an outside with respect to the circumferential wide major groove toward the circumferential wide major groove in the tire axis direction.

7. The pneumatic tire of claim 6, wherein, a length of the bottom raising portion in the tire axis direction is set in the range of 60 to 200% of a groove width of the circumferential wide major groove.

8. The pneumatic tire of claim 6, wherein a depth of a top portion of the bottom raising portion is set to 10% or less of a depth of the first transverse groove when each depth is measured from a wheel tread surface of the tread.

9. The pneumatic tire of claim 6, wherein the width of the second transverse groove is set in the range of 10 to 80% of the width of the first transverse groove.

10. The pneumatic tire of claim 1, wherein, in the narrow circumferential minor groove, a groove wall on the tire equatorial plane side is linearly extended in the tire circumferential direction and an angle of the groove wall with respect to a normal reference to a wheel tread surface ranges from 40 degrees to 80 degrees.

11. The pneumatic tire of claim 1, wherein, in the narrow circumferential minor groove, the groove wall on the tire equatorial plane side is coupled to the opposing groove wall on the outside in the tire axis direction at the stepping-on side with respect to the block.

* * * * *